United States Patent
Khan et al.

(10) Patent No.: US 11,453,599 B1
(45) Date of Patent: Sep. 27, 2022

(54) HYBRID PHOTOACTIVE HETEROJUNCTION AND METHOD OF PREPARATION THEREOF

(71) Applicant: KING FAHD UNIVERSITY OF PETROLEUM AND MINERALS, Dhahran (SA)

(72) Inventors: Ibrahim Khan, Dhahran (SA); Muhammad Ashraf, Dhahran (SA); Nadeem Baig, Dhahran (SA); A. H. Hendi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/714,580

(22) Filed: Apr. 6, 2022

(51) Int. Cl.
*B01J 23/22* (2006.01)
*B01J 23/72* (2006.01)
*B01J 35/00* (2006.01)
*C01G 31/00* (2006.01)

(52) U.S. Cl.
CPC .............. *C01G 31/00* (2013.01); *B01J 23/22* (2013.01); *B01J 23/72* (2013.01); *B01J 35/004* (2013.01)

(58) Field of Classification Search
CPC .......... B01J 23/22; B01J 23/72; B01J 35/004; C01G 31/00
See application file for complete search history.

(56) References Cited

FOREIGN PATENT DOCUMENTS

| CN | 104112871 A | 10/2014 |
| CN | 108380211 A | 8/2018 |
| CN | 107287615 B | 10/2019 |
| JP | 2021-62995 A | 4/2021 |

OTHER PUBLICATIONS

Muhammad Ashraf, et al., "A Bifunctional 2D Interlayered β-$Cu_2V_2O_7$/$Zn_2V_2O_6$ (CZVO) Heterojunction for Solar-Driven Nonsacrificial Dye Degradation and Water Oxidation", Energy Technology, vol. 9, Issue 7, Apr. 12, 2021, pp. 1-13.

Tatiana Krasnenko, et al., "Atomic and Electronic Structure of Zinc and Copper Pyrovanadates with Negative Thermal Expansion", Advances in Science and Technology, vol. 63, Oct. 2010, pp. 358-363 (Abstract only).

Michael Schindler, et al., "Structural Characterization of the β-$Cu_2V_2O_7$-α-$Zn_2V_2O_7$ Solid Solution", Journal of Solid State Chemistry, vol. 146, Issue 1, Aug. 1999, pp. 271-276 (Abstract only).

*Primary Examiner* — Cam N. Nguyen
(74) *Attorney, Agent, or Firm* — Oblon, McClelland, Maier & Neustadt, L.L.P.

(57) ABSTRACT

A hybrid photoactive heterojunction including a copper vanadate, $Cu_2V_2O_7$ (CVO) and a zinc vanadate, $Zn_2V_2O_6$ (ZVO). Particles of the ZVO are dispersed in particles of the CVO to form the hybrid photoactive heterojunction. The hybrid photoactive heterojunction in the form of a photoactive film includes a substrate which is at least partially coated with the hybrid photoactive heterojunction. A method of photodegrading a dye includes contacting the photoactive film and the dye in a solution and exposing the solution to light. A method of photoelectrochemically oxidizing water includes contacting the photoactive film with water in a solution and exposing the solution to light.

9 Claims, 16 Drawing Sheets

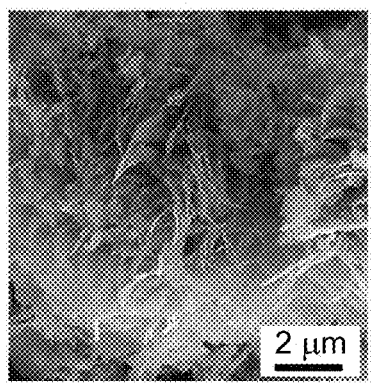 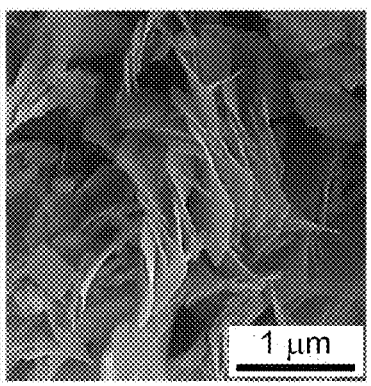 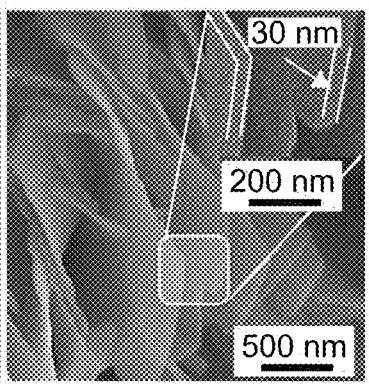
FIG. 3A  FIG. 3B  FIG. 3C
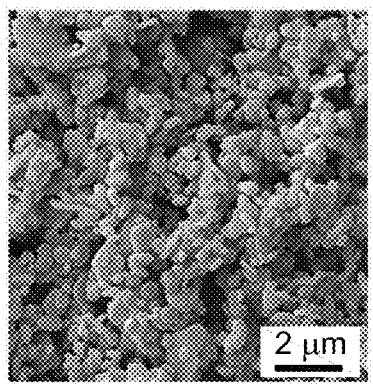 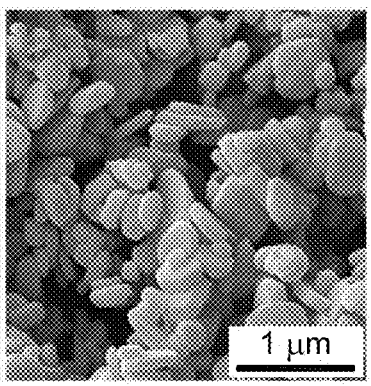 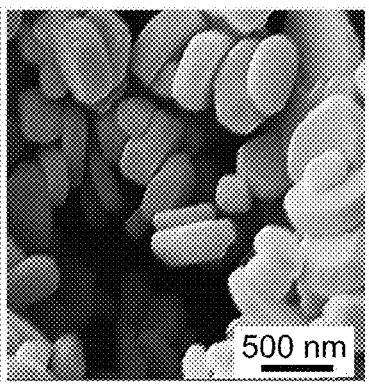
FIG. 3D  FIG. 3E  FIG. 3F
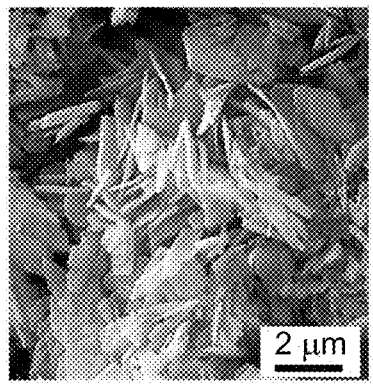 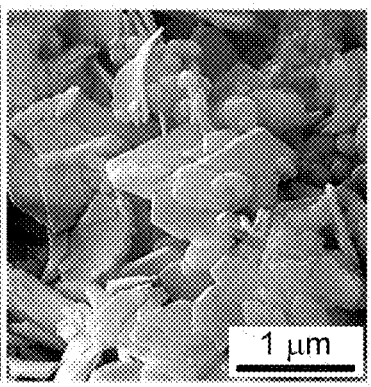 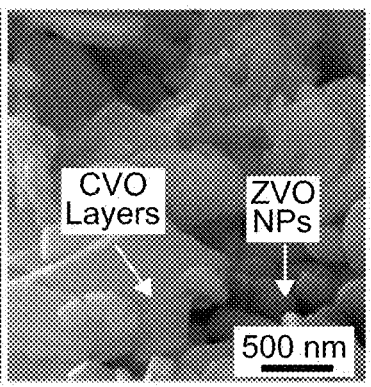
FIG. 3G  FIG. 3H  FIG. 3I

HYBRID PHOTOACTIVE HETEROJUNCTION AND METHOD OF PREPARATION THEREOF

STATEMENT OF PRIOR DISCLOSURE BY AN INVENTOR

Aspects of the present disclosure are described in M. Ashrak, et. al, "A Bifunctional 2D Interlayered β-$Cu_2V_2O_7$/$Zn_2V_2O_6$ (CZVO) Heterojunction for Solar-Driven Nonsacrificial Dye Degradation and Water Oxidation"; Apr. 12, 2021; Energy Technology; 9: 2100034, incorporated herein by reference in its entirety.

BACKGROUND

Technical Field

The present disclosure is directed to a hybrid photoactive heterojunction, and particularly to a copper vanadate (CVO) and a zinc vanadate (ZVO) based hybrid photoactive heterojunction and a method of preparation of vanadates thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Removing harmful dye contaminants from water is necessary to maintain aquatic life and clean water sources. Also, water splitting can be used as clean, zero-emission fuel generation in the form of hydrogen and oxygen, thus limiting the continuous generation of environmentally hazardous $CO_x$, $NO_x$, and $SO_x$ greenhouse gases that come from using other fuel sources. Over the years, a considerable number of photoactive, and photostable photocatalysts have been explored by various researchers which has produced results in terms of photocatalytic dye removal and photoelectrochemical (PEC) water oxidation. However, existing catalysts are limited by harsh protocols such as extremely acidic/basic media, elevated temperature, and high cost of electrode materials. Furthermore, the oxygen evolution reaction (OER) (a rate-determining step in water splitting) is thermodynamically as well as kinetically less favorable than a hydrogen evolution reaction (HER), which should be considered when designing water splitting catalysts. Therefore, the development of a novel advanced material is needed to overcome the aforementioned problems associated with water decontamination and water splitting.

SUMMARY

In an exemplary embodiment, a hybrid photoactive heterojunction is described. The hybrid photoactive heterojunction includes a copper vanadate $Cu_2V_2O_7$ (CVO) and a zinc vanadate, $Zn_2V_2O_6$ (ZVO). The particles of the ZVO are dispersed in particles of the CVO to form the hybrid photoactive heterojunction.

In some embodiments, the hybrid photoactive heterojunction includes a CVO to ZVO weight ratio of 1-5:1-5 based on the total weight of the CVO and ZVO.

In some embodiments, the ZVO is in the form of substantially ovoid shaped tablet nanoparticles having an average length of 200-400 nanometers (nm), an average width of 100-300 nm, and an average thickness of 50-150 nm, the CVO is in the form of layered nanosheets having an average thickness of 30-50 nm and an average spacing of 100-300 nm between layers, at least a portion of the ZVO nanoparticles penetrate between the layers of the CVO and at least a portion of the ZVO nanoparticles are on top of the layers of the CVO.

In some embodiments, the CVO and ZVO are at least 95% monoclinic crystal phase.

In an exemplary embodiment, a photoactive film is described. The photoactive film includes the hybrid photoactive heterojunction and a substrate. The substrate is at least partially coated with the hybrid photoactive heterojunction.

In some embodiments, the substrate of the photoactive film is selected from a group consisting of fluorinated tin oxide, indium tin oxide, and aluminum doped zinc oxide.

In an exemplary embodiment, a method of photodegrading a dye is described. The method of photodegrading the dye includes contacting the photoactive film and the dye in a solution and exposing the solution to light.

In some embodiments, the dye is selected from a group consisting of a thiazine dye, a triazine dye, an azo dye, and a xanthene dye.

In some embodiments, the photoactive film degrades at least 70% of the dye when the CVO to ZVO weight ratio is 1:1-5 based on the total weight of the CVO and ZVO.

In some embodiments, the photoactive film has a photo-current density of 1.3-1.9 milliampere centimeter$^{-2}$ (mA cm$^{-2}$) at 1.1-1.3 variable-range hopping (VRH) when the CVO to ZVO weight ratio is 1:1-5 based on the total weight of the CVO and ZVO.

In some embodiments, the photoactive film maintains at least 95% of the photo-current density after up to 2 hours of light exposure.

In some embodiments, the photoactive film has an incident photon to current conversion efficiency up to 35% at 300-350 nm when the CVO to ZVO weight ratio is 1:1-5 based on the total weight of the CVO and ZVO.

In some embodiments, the photoactive film has a bandgap of 1.9-2.0 electron volt (eV).

In an exemplary embodiment, a method of a photoelectrochemically oxidizing water is described. The method includes contacting the photoactive film with water to form a solution and exposing the solution to light.

In an exemplary embodiment, a method of making the CVO and ZVO is described. The method includes mixing a vanadate salt with a copper (Cu; II) salt for making CVO or a zinc (Zn) salt for making ZVO, in a polar protic solvent to form a mixture, where the weight ratio of V to Zn or Cu is 1:1-2 based on the total weight of V and Zn or Cu, adding to the mixture a surfactant in a 1:3-6 surfactant to Zn or Cu weight ratio based on the total weight of surfactant and Zn or Cu to form a reaction solution, sonicating the reaction solution for at least 20-50 minutes at a temperature of 40-60 degrees centigrade (° C.) to form a sonicated solution, heating the sonicated solution in an autoclave at a temperature of 100-140° C. for 10-20 hours to form a product solution, filtering, washing with a polar aprotic solvent, and drying the product solution at a temperature of 40-60° C. to leave the product; and calcining the product at a temperature of 200-600° C. to leave CVO or ZVO.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A depicts a high-resolution field emission scanning electron microscope (FE-SEM) image of interlayered CVO, according to certain embodiments;

FIG. 3B depicts a low-resolution FE-SEM image of the interlayered CVO, according to certain embodiments;

FIG. 3C depicts a FE-SEM nanograph of the interlayered CVO, according to certain embodiments;

FIG. 3D depicts a high-resolution FE-SEM image of ZVO nanotablets, according to certain embodiments;

FIG. 3E depicts a low-resolution FE-SEM image of the ZVO nanotablets, according to certain embodiments;

FIG. 3F depicts a FE-SEM nanograph of the ZVO nanotablets, according to certain embodiments;

FIG. 3G depicts a high-resolution FE-SEM image of copper and zinc vanadate (CZVO) hybrid, according to certain embodiments;

FIG. 3H depicts a low-resolution FE-SEM image of the CZVO hybrid, according to certain embodiments;

FIG. 3I depicts a FE-SEM nanograph of the CZVO hybrid, according to certain embodiments;

FIG. 7A shows I-V curves using various CVO:ZVO ratios, FIG. 7B shows I-V curves for CZVO 1:5 samples under light and in the dark, FIG. 7C shows transient photo-current densities (I-t) curves, FIG. 7D shows photo-stability curves, FIG. 7E shows % applied bias photon-to-current efficiency (ABPE) measurements, FIG. 7F shows % incident photon-to-current con-version efficiency (IPCE) analysis, FIG. 7G shows electrochemical impedance spectroscopy (EIS) Nyquist plots, and FIG. 7H shows optical bandgap calculation curves, according to certain embodiments;

DETAILED DESCRIPTION

Figure 1:
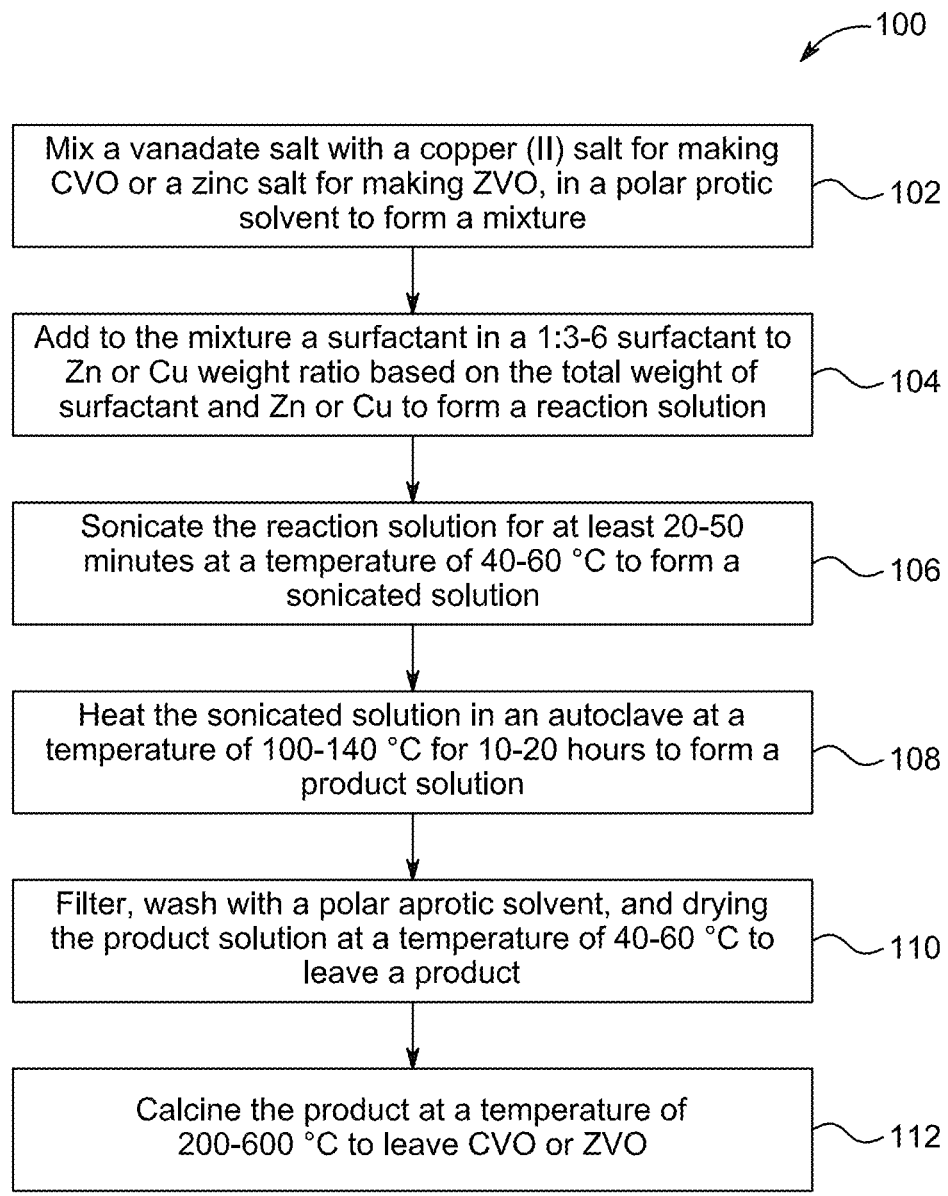
FIG. 1 is a schematic flow diagram of a method of making a copper vanadate (CVO) and a zinc vanadate (ZVO), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the term "hybrid" refers to a composition made by combining two different elements.

As used herein, the term "photoactive" refers to a composition capable of a chemical or physical change in response to illumination.

As used herein, the term "heterojunction" refers to an interface between two layers or regions of dissimilar semiconductors.

As used herein, the term "nanoparticles" refers to a particle of matter that is between 1 and 1000 nanometers in diameter.

As used herein, the term "nanosheets" refers to a two-dimensional nanostructure with thickness in a scale ranging from 1 to 1000 nm.

As used herein, the term "monoclinic crystal phase" refers to a crystal relating to or belonging to the crystal system characterized by three unequal axes, one pair of which are not at right angles to each other.

As used herein, the term "photodegrading" refers to an alteration of materials by light.

As used herein, the term "photo-current" refers to an electric current through a photosensitive device, such as a photodiode, as the result of exposure to radiant power.

As used herein, the term "photo-electrochemical" refers to a physical chemistry concerned with the interaction of light with electrochemical systems.

Embodiments of the present disclosure are directed towards a hybrid photoactive heterojunction. The hybrid photoactive heterojunction includes a trimetallic copper and zinc vanadate (CZVO) demonstrating a bifunctional, non-sacrificial photo-response in the cases of bifunctional photocatalytic dye decontamination and water-splitting characteristics. The present disclosure confirms that efficient light trapping, sufficient photo-exciton generation, and minimal charge recombination in the case of the CZVO photoanodes is due to preferable optical band alignment after the mixing of the CVO and ZVO.

The hybrid photoactive heterojunction includes copper vanadate, $Cu_2V_2O_7$ (CVO), and zinc vanadate, $Zn_2V_2O_6$ (ZVO), where particles of the ZVO are dispersed in particles of the CVO to form the hybrid photoactive heterojunction. In some embodiments, the hybrid photoactive heterojunction includes the CVO to ZVO weight ratio of 1-5:1-5, preferably 1-3:3-5, or 1-2:4-5 based on the total weight of the CVO and ZVO. In an embodiment, the hybrid photoactive heterojunction includes the CVO to ZVO weight ratio of 1:5 based on the total weight of the CVO and ZVO In an embodiment, the ZVO is in the form of substantially ovoid shaped tablet nanoparticles having an average length of 100-600 nm, preferably 200-500 nm, or 300-400 nm an average width of 100-400 nm, preferably 150-350 nm, or 200-300 nm and an average thickness of 50-150 nm, preferably 75-125 nm, or 90-100 nm. In an embodiment, the CVO is in the form of layered nanosheets having an average thickness of 10-50 nm, preferably 20-40 nm, or 25-30 nm and an average spacing of 100-300 nm, preferably 150-250 nm, or 190-210 nm between layers. In an embodiment, in the CZVO heterojunction at least a portion of the ZVO nanoparticles penetrate between the layers of the CVO and at least a portion of the ZVO nanoparticles are on top of the layers of the CVO. In an embodiment, 50% of the ZVO nanoparticles penetrate between the layers of the CVO and 50% of the ZVO nanoparticles are on top of the layers of the CVO. In an embodiment, 90% of the ZVO nanoparticles penetrate between the layers of the CVO and 10% of the ZVO nanoparticles are on top of the layers of the CVO.

In another embodiment, the CVO and ZVO are at least 95%, preferably 98% or 100% monoclinic crystal phase. In an embodiment the CVO and ZVO are 95% monoclinic and 5% triclinic. The CVO and ZVO are not required to be in the same crystalline phase. In an embodiment the CVO is 100% monoclinic and the ZVO is 95% monoclinic and 5% triclinic. The XRD patterns of the CVZO (FIG. 4B) is a combination of the CVO and ZVO XRD patterns with peaks of ZVO between 20-23°, preferably 20.5-22°, or 21-21.5°, and 26-29°, preferably 26.5-28.5°, or 27-28°, and overlapping peaks of CVO and ZVO from 28-31°, and 28.5-30.5°, or 29-30°, and 37-44°, preferably 39-42°, or 40-41°. XPS analysis (FIG. 5) confirms the presence of elements Z, V, Cu. and O.

In an exemplary embodiment, a photoactive film including the hybrid photoactive heterojunction is disclosed. The photoactive film further includes a substrate that is at least partially coated with the hybrid photoactive heterojunction. In an embodiment, the substrate is at least 80%, preferably 90%, or 100% coated with the hybrid photoactive heterojunction. In an embodiment, the substrate is selected from a group consisting of fluorinated tin oxide, indium tin oxide, and aluminum doped zinc oxide. In an embodiment, the substrate is fluorinated tin oxide (FTO). In an embodiment, the substrate has a surface area of 5-50 $cm^2$, preferably 10-40 $cm^2$, or 20-30 $cm^2$. In an embodiment, the substrate is coated through a dip-coating method. In an embodiment the substrate is dipped into a solution of the CZVO for at least 1 hour, and later withdrawn at a rate of 0.1-0.5 cm/min, preferably 0.1-0.4 cm/min, or 0.1-0.2 cm/min. After removing from solutions, the photocatalysts deposited on the substrates are heated to a temperature of 200-300° C., preferably 220-280° C., or 240-260° C. for at least 6 hours, preferably 6-10 hours, or 7-8 hours.

In another exemplary embodiment, a method of photodegrading a dye is described. The method includes contacting the photoactive film, and the dye in a solution and then exposing the solution to light. In another embodiment, the dye is selected from a group consisting of a thiazine dye, a triazine dye, an azo dye, and a xanthene dye. The dye may be but is not limited to, methylene blue, azure A, methylene green, acid red, acid orange, alcian yellow, and rose bengal. In an embodiment, the dye is methylene blue. In an embodiment, the solution has 10-500 ppm of the dye, preferably 50-300 ppm, or 100-200 ppm. In an embodiment, the solution is exposed to at least 1 Sun of visible light, preferably 1-3 Sun or 1-2 Sun. In yet another embodiment, the photoactive film degrades at least 70% of the dye, preferably 80%, or 100% of the dye. In an embodiment, the active species generated for degrading the dye are protons, electrons, hydroxide radicals, and oxygen radicals. In an embodiment, protons and hydroxide radicals are the active species.

In another exemplary embodiment, a method of photoelectrochemically oxidizing water, includes contacting the photoactive film with water to form a solution and exposing the solution to light. In an embodiment, electrochemical properties are measured with the CZVO photoactive film as the working electrode, platinum, gold, graphite, or glassy carbon as the counter electrode and Ag/AgCl, standard hydrogen, or saturated calomel as the and reference electrode. The electrodes are in an electrolyte solution, wherein the electrolyte may be but is not limited to an alkaline earth metal salt, and/or an alkali metal salt dissolved in water.

In an exemplary embodiment, a method of water splitting, includes contacting the photoactive film and a hydrogen evolution cathode with water to form a solution and exposing the solution to light. The photoactive film acting as an oxygen evolution reaction catalyst. In some embodiments, the hydrogen evolution cathode is made from at least one of the following materials, platinum, silver, copper, or any materials known in the art as hydrogen evolution catalysts.

The photoactive film of the present disclosure has a photo-current density of 1.3-2.0 mA $cm^{-2}$, preferably 1.4-1.9, or 1.7-1.8 at 1.1-1.3 $V_{RHE}$. Further, the photoactive film is capable of maintaining at least 95%, preferably 98% or 100% of the photo-current density after up to 2 hours of light exposure. In some embodiments, the photoactive film has an incident photon to current conversion efficiency up to 35%, 25-35% or 30-35% at 300-350 nm. Furthermore, the photoactive film has a bandgap of 1.9-2.0 eV. In an embodiment, the CZVO has a photocurrent at least 1.5 times, preferably at least 2 times or 3 times larger than that of ZVO or CVO individually.

Figure 2:
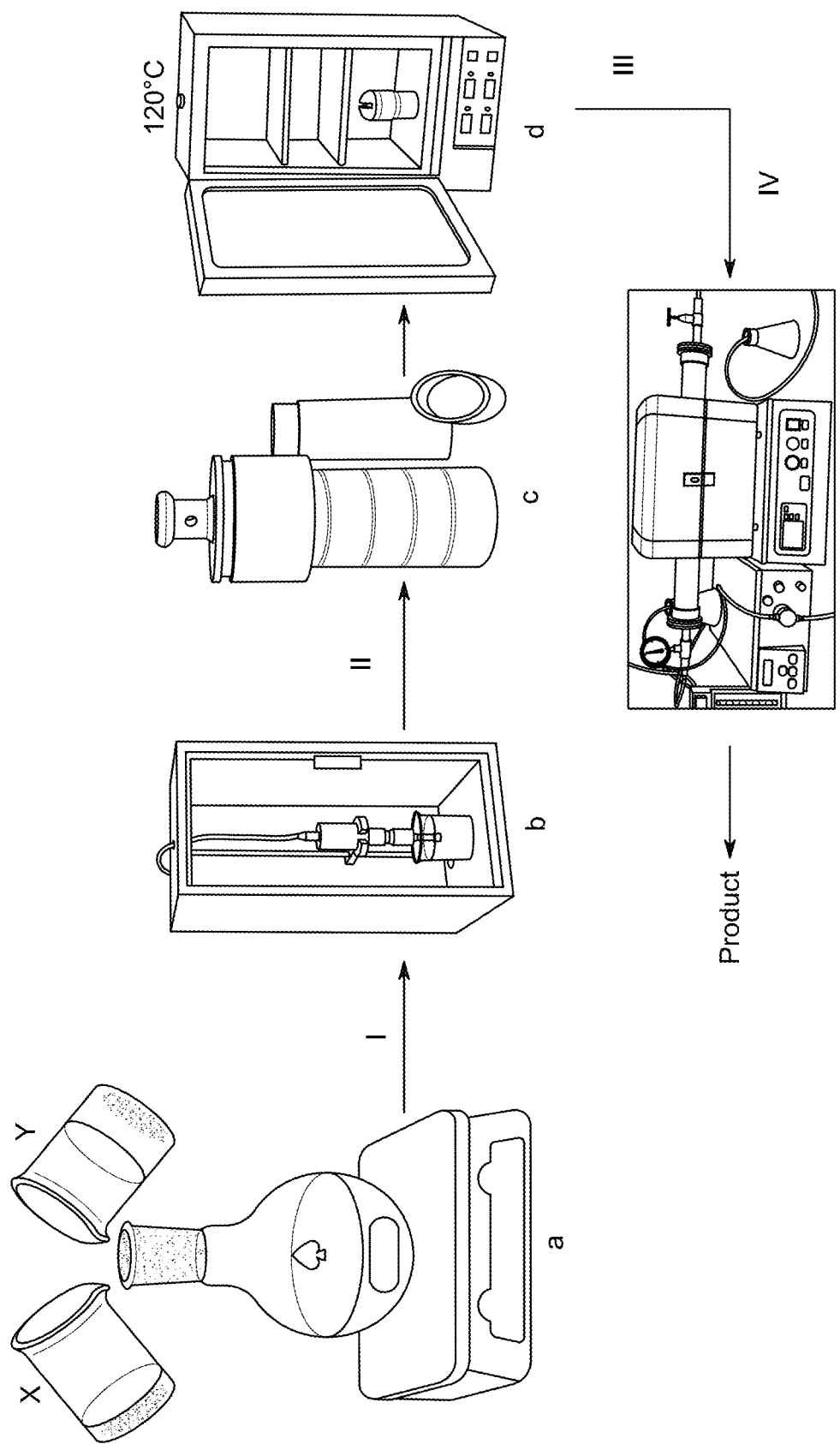
FIG. 2 is a schematic for the synthesis of metal vanadates using nitrate and vanadate precursors, according to certain embodiments.

Referring to FIG. 1, a schematic flow diagram of a method 100 of preparing the CVO and ZVO is illustrated. The method 100 is described with reference to the synthesis of metal vanadates using nitrate and vanadate precursors which is illustrated in FIG. 2. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes mixing a vanadate salt with a copper (II) salt or a zinc salt, to make CVO or ZVO, respectively, in a polar protic solvent to form a mixture. In an embodiment, the zinc salt is selected from the group consisting of zinc nitrate, zinc chloride, zinc sulfate, and hydrates thereof. In an embodiment, the vanadate salt is selected from the group consisting of ammonium metavanadate, sodium vanadate, potassium vanadate, and hydrates thereof. In an embodiment, the copper (II) salt is selected from the group consisting of copper chloride, copper sulfate, copper hydroxide, copper nitrate, copper acetate, and hydrates thereof. In an alternative embodiment, the vanadate salt is $NH_4VO_3$, the copper (II) salt is hydrated $Cu(NO_3)_2 \cdot XH_2O$ and the zinc salt is $Zn(NO_3)_2 \cdot 6H_2O$. The polar protic solvents can include one or more of ethanol, methanol, ammonia, acetic acid, or any other solvents known in the art. In an embodiment, the polar protic solvent is ethanol.

At step 104, the method 100 includes adding to the mixture a surfactant in a 1:3-6 surfactant to Zn or Cu weight ratio based on the total weight of surfactant and Zn or Cu to form a reaction solution. In an embodiment, the surfactant to Zn or Cu is about 1:5 to form a reaction solution. In an embodiment, the surfactant is selected from the group consisting of poloxamer 188, poloxamer 407, and poloxamer 123. In an embodiment, the surfactant is poloxamer 123.

At step 106, the method 100 includes sonicating the reaction solution for at least 10-60 minutes, preferably 20-50, or 30-40 minutes at a temperature of 40-60° C., preferably 45-55, or 48-52° C. to form a sonicated solution. In an embodiment, the mixture was subjected to pulse sonication for 30 min using an ultra/probe sonicator at 50° C.

At step 108, the method 100 includes heating the sonicated solution in an autoclave at a temperature of 100-150° C., preferably 110-140, or 120-130° C. for 10-20 hours, preferably 12-18, or 14-16 hours to form a product solution. In an embodiment, after ultrasonic probe treatment, the solution was transferred to a sealed Teflon lined autoclave and kept at 120° C. for 12 h.

At step 110, the method 100 includes filtering, washing with a polar aprotic solvent, and drying the product solution at a temperature of 40-60° C., preferably 45-55° C., or 48-52° C. to leave the product. The polar aprotic solvents can include one or more of acetone, chloroform, dichloromethane, or any other solvents known in the art.

At step 112, the method 100 includes calcining the product at a temperature of 200-600° C. to leave CVO or ZVO. In an embodiment, the product was calcined to a temperature of about 500° C. to obtain the tablet shaped ZVO nanoparticles (NPs). In another embodiment, the product was calcined at 250° C. to obtain the interlayered-shaped CVO products.

EXAMPLES

The following examples describe and demonstrate exemplary embodiments of a hybrid photoactive heterojunction described herein. The examples are provided solely for the purpose of illustration and are not to be construed as limitations of the present disclosure, as many variations thereof are possible without departing from the spirit and scope of the present disclosure.

Example 1: Materials Required $NH_4VO_3$ (Sigma Aldrich) as a vanadate source and hydrated metal nitrate salt precursors, i.e., $Cu(NO_3)_2 \cdot xH_2O$ (Sigma Aldrich) and $Zn(NO_3)_2 \cdot 6H_2O$ (Sigma Aldrich), were used. The surfactant source was pluronic polymer made of triblock copolymer, i.e., poly(ethylene oxide)-poly(propylene oxide)-poly(ethylene oxide) (PEO-PPO-PEO; P-123) (Sigma Aldrich). De-ionized (DI) water and absolute ethanol were used for reaction and washing purposes.

Example 2: Synthesis of $\beta$-$Cu_2V_2O_7$ and $Zn_2V_2O_6$

FIG. 2 illustrates a synthetic scheme of $\beta$-$Cu_2V_2O_7$ (CVO) and $Zn_2V_2O_6$ (ZVO) photocatalysts conducted by a pulse sonication-assisted ultrasonic technique. In both cases, $NH_4VO_3$ herein denoted as "X" acts as the vanadate source, hydrated $Cu(NO_3)_2 \cdot xH_2O$ and $Zn(NO_3)_2 \cdot 6H_2O$ sources serve as copper salts and zinc salts to their respective metal vanadates denoted as "Y". In each case, the measured quantities of respective precursors were added to 50 mL of absolute ethanol. The weight percentage (wt. %) ratio of vanadium and respective transition metal precursors were adjusted, as shown in Table 1A, Table 1B, and FIG. 2, with other reaction conditions.

TABLE 1A

| Types of metal vanadates [Code] | Stoichiometry | Metals: vanadates precursor weigh tratio | Surfactant-to-metal precursor weight ratio |
|---|---|---|---|
| $Cu_2V_2O_7$ (CVO) | Nonstoichiometric | 1:1 | 1:5 |
| $ZnV_2O_6$ (ZVO) | Stoichiometric | 1:2 | 1:5 |
| $Cu_2V_2O_7/ZnV_2O_6$ (CZVO) heterojunction Nonstoichiometric | Nonstoichiometric | CVO:ZVO (ranging from 1:1, 1:2, 1:3, 1:4, 1:5, 2:1, 3:1, 4:1, to 5:1) | Not used |

TABLE 1B

| Types of metal vanadates [Code] | Reaction temperature and time | Physical appearance |
|---|---|---|
| $Cu_2V_2O_7$ (CVO) | 120° C. for 12 h | Dark brown color |
| $ZnV_2O_6$ (ZVO) | 120° C. for 12 h | Yellowish color |
| $Cu_2V_2O_7/ZnV_2)O6$ (CZVO) heterojunction Nonstoichiometric | Pulse sonication mixing for 30 min at 50° C. | Varied (mainly dark bluish green and red) |

Many trials were conducted to adjust the amount of P-123 surfactant to achieve distinct morphology in each case, and it was realized that five-times P-123 (by mass) of metal precursors had a significant impact on the morphology control. The five-times wt. % quantity of P-123 was suitable to form micelles in the reaction mixture under given reaction conditions, which provided small reaction chambers for the formation of final structures using a magnetic stirrer (a). The mixture (X and Y) was further was subjected to pulse sonication (I) for 30 min using an ultra/probe sonicator (b) (SONICS-4000 Vibra-Cell) operated at 20% amplitude at 50° C. The pulses were provided at 10 s ON and 3 s OFF cycles. During pulse sonication, the frequency and power of sonication were auto maintained by the device at ≈20 kHz and 72 W $cm^2$, respectively. After ultrasonic probe treatment, the solution (II) was transferred to a sealed Teflon-lined autoclave (c) and kept in electric oven (d) at 120° C. for 12 h. Finally, the sample was washed (III) several times with absolute ethanol and allowed to dry. The final product was subjected to calcination (IV) at respective temperatures and heated to 500° C. to obtain the tablet-shaped ZVO nanoparticles (NPs) and to 250° C. for interlayered-shaped CVO products.

Example 3: Synthesis of $Cu_2V_2O_7/Zn_2V_2O_6$ Heterojunction $Cu_2V_2O_7/Zn_2V_2O_6$ (CZVO) hybrid was acquired by the rational ultrasonic mixing of CVO and ZVO. The reaction conditions are listed in Table 1A and Table 1B. Various ratios of CVO and ZVO (ranging from 1:1 to 1:5 by weight, alternatively) were mixed to understand the influence of each component on an overall photocatalytic performance. The mixtures were subjected to overnight drying at room temperature. The color of the dry samples was found to be dependent on the mixing concentration of each component, and a color change from dark greenish to dark blue was observed when the CVO concentration increased. Based on the photocatalytic performance, 1 (CVO):5 (ZVO) ratio was found to be highest performing, which was labeled as CZVO 1:5. At ratios beyond 1:5, no significant improvement in the catalytic activity was observed with the CZVO sample, possibly due to the saturation of the active sites. Further studies were performed with the CVO:ZVO ratio of 1:5, herein after labeled CZVO 1:5.

Example 4: Characterization

The morphological features of the synthesized CVO, ZVO, and CZVO were characterized by FESEM (Tescan Lyra-3) operated at 20 kV. To assign the features of the metal oxygen vibrations, surface-enhanced Raman scattering (SERS) spectroscopy (Tag no. 340326) was utilized at a spectrum window of 50-1100 $cm^{-1}$. SERS was operated at 532 nm green laser (50% intensity) for an exposure time of 15 s. The spectra were recorded by a charge-coupled device (CCD) detector. To support SERS, infrared (IR) spectra were recorded from 625 to 2000 $cm^{-1}$ at a 2.0 $cm^{-1}$ resolution by a Fourier-transform infrared spectrometer (Nicolet 6700 FT-IR, TEC), being fit with a deuterated triglycine sulfate (DTS) detector. Powder X-ray diffraction (XRD) patterns of the calcined samples were recorded on a Rigaku miniflex II X-ray diffractometer in step-scan mode between 20 and 65 °2θ (scan rate: $0.02°s^1$) using Cu Kα radiation (λ ¼ 1.5414 Å). Moreover, the chemical composition of CZVO was investigated using an X-ray photoelectron spectrometer (XPS) (Thermo Scientific ESCALAB 250 Xi) equipped with an Al Kα (1486.6 eV) X-ray source at an ultrahigh vacuum of 8 1010 mbar. All binding energies (BEs) of the XPS spectra were calibrated with the adventitious C (1 s) peak positioned at 284.6 eV. Finally, the optical bandgap was determined using Tauc's plots obtained via a diffuse-reflectance spectrophotometer (Model Cary 5000 UVvis-NIR) having a Pb smart detector.

Example 5: Fabrication and Photocatalytic Testing of CVO, ZVO, and CZVO Films The dip-coating method was used for the fabrication of all films. For each sample of CVO, ZVO, and CZVO, a 12 $cm^2$ fluorinated tin oxide (FTO) glass was washed and immersed in a highly dispersed solution of corresponding photocatalysts. In each case, 50 mg of CVO, ZVO, and CZVO/250 mL of the dispersed solution in the coating experiments was used. The immersed FTO glass was kept suspended in individual solutions for 1.0 h, which was followed by slow withdrawing at 0.2 $cm/min^1$. After removing from solutions, the photocatalysts deposited on FTOs were subjected to calcination for 6 h in the following order, i.e., ZVO=500° C., CVO=250° C., and CZVO=250° C.

Example 6: Photocatalytic Dye Degradation Testing

Photocatalytic activities of the as-fabricated films were studied using 100 parts per million (ppm) model methylene blue (MB) dye. In each experiment, the deposited photocatalyst films were inserted within the 100 ppm MB solution in the dark. The solution was kept for 6 h under continuous slow magnetic stirring (200 revolution per minute (rpm)), so that more MB molecules adsorb at the film surface without noteworthy degradation in the darkness. The collected sample was analyzed at this stage, and the results did not indicate any significant dye degradation even after 6 h, confirming the highly photoactive nature of CVO, ZVO, and CZVO films. This was followed by brief light irradiation (under adjusted 1 sun intensity) and periodic sample collection (every 5 min). The sample was quickly analyzed using a DuettaHoriba fluorescence and absorbance spectrometer. Equation (1) is utilized to measure the percent degradation of the MB dye with respect to time.

$$\% \text{ Removal} = \frac{C_0 - C_t}{C_0} \times 100 \quad (1)$$

Example 7: Photo Electrocatalytic Water Oxidation Testing

Photoelectrochemical (PEC) water oxidation measurements were carried out using potentiostat/galvanostat (Gamry Instruments, Reference 600+) connected to a three-electrode PEC quartz cell. The CVO-, ZVO-, and CZVO-deposited FTO glass served as the working electrode, whereas Pt gauze and silver/silver chloride (Ag/AgCl) (saturated potassium chloride (KCl)) worked as counter and reference electrodes, respectively. For the electrolyte, a mixture of 0.2 Molar (M) phosphate buffer (having a pH of 6.8 measured by a digital pH meter) and 0.3M potassium sulphate (K2SO4) was freshly used for each sample. Prior to each PEC experiment, argon gas was bubbled for a brief time of 3 h to purge dissolved oxygen from the electrolyte to avoid the effect of foreign oxygen. Linear sweep voltammogram (LSV) scans and chronoamperometry measurements were recorded under a class AAA solar simulator (sol-3A), which was calibrated against silicon diode to resemble the AM1.5 global spectrum closely. The photocurrent-potential (I-V) curves were obtained in the potential range from 0 V to 1.50 VRHE at a scan rate of 0.05 mV s-1. The measured potentials were converted to the reversible hydrogen electrode (RHE) scale using Nernstian's relation (Equation (2)).

$$V_{RHE} = V_{Ag/AgCl} + 0.0591 \text{ (V)} + 0.197 \text{ (V)} \quad (2)$$

The applied bias photon-to-current efficiencies (% ABPE) of CVO, ZVO, and CZVO 1:5 photoanodes were obtained from the IV curves using Equation (3).

$$APBE(\%) = \frac{I_{ph}(1.23 - |V_{bias}|)}{P_{light}} \times 100 \quad (3)$$

where $I_{ph}$ is the photo-current density (mA cm$^{-2}$), $V_{bias}$ is the applied potential versus RHE, and Plight represents the power density of illumination, i.e., 100 mWcm$^{-2}$. The transient photocurrent time (I-t) curves were recorded under chopped light irradiation (light ON/OFF cycles: 40 s) at a fixed bias potential of 1.30 V$_{RHE}$. Incident photon-to-current conversion efficiency (IPCE) measurements were carried out with a 300 W xenon lamp (Oriel) connected to a grating monochromator (Acton Spectra Pro 2155). The IPCE was calculated by Equation (4).

$$IPCE\% = \frac{1240 I_{ph}(\lambda)}{P(\lambda)\lambda(nm)} \times 100 \quad (4)$$

where $I_{ph}$ is the photo-current density (mA cm$^{-2}$), P is the incident light power density (mW cm2), and λ is the applied wavelength (nm). The EIS was obtained under simulated solar light (AM 1.5G, 100 mWcm$^{-2}$) at 0.2 V$_{RHE}$ in the frequency range from 100 kHz to 0.01 Hz with a small AC amplitude of 5 mV using Gamry-inbuilt EIS part. After each analysis, the electrolyte was exchanged to avoid undesired shifts in the pH.

FE-SEM revealed unique and distinct morphological features of as-synthesized CVO, ZVO, and CZVO 1:5 photoactive materials. FIGS. 3A-3C illustrates the unique interlayered morphology of CVO. The layered morphology offers potential interfacial interactions (adsorption of target species) during photocatalysis and PEC processes. Likewise, FIG. 3D-3F shows ZVO as highly distinct and unique semicircular tablet-shaped NPs (particle size <400 nm), with thick edges (≈100 nm). The ZVO NPs are reasonably dispersed at the given scale. FIGS. 3G-3I show the CZVO hybrid designates the retained morphology of CVO. Moreover, few ZVO NPs may be seen on the surface of CVO, whereas it was believed that most of those enter the interlayer regions or attach below the layers. The successful dispersion of ZVO NPs on/within the CVO layers establishes physicochemical interactions, which can facilitate the photocatalytic performance of CZVO hybrid. The intimate interaction between CVO and ZVO was also supported by other analytical techniques. Moreover, mechanical reduction in CZVO flakes led to enhanced photocatalytic activity due to possible enhancement of the surface area, crystal defects creation, and variation in the surface chemistries.

Figure 4A:
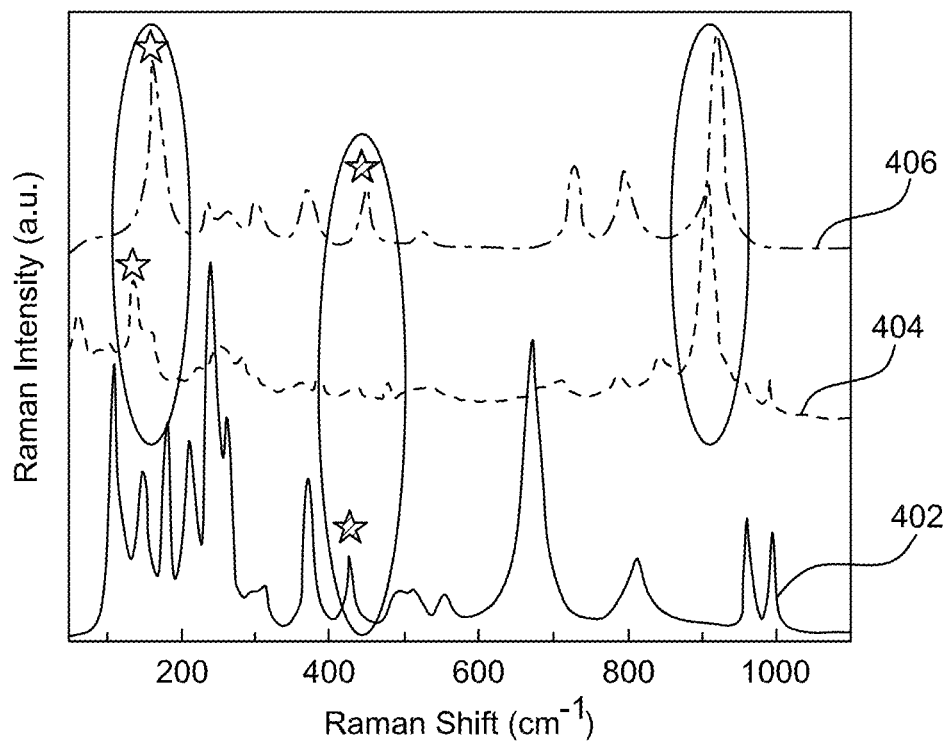
FIG. 4A illustrates Raman spectra of the layered CVO, ZVO nanoparticles (NPs), and CZVO nanostructures, according to certain embodiments.

Metal vanadates are composed of binary oxides, i.e., vanadium oxide and the corresponding metal oxide. Therefore, FIG. 4 illustrates the purpose of Raman and Fourier transform infrared (FT-IR) (also referred in FIG. 9) is to assign the molecular vibrations of the synthesized materials, namely ZVO (402), CVO (404), and CZVO (406) and investigate the probable interaction between CVO (404) and ZVO (402) in the hybrid. The Raman spectrum of CVO (404) depicts signature peaks corresponding to CuO, VO, and OH vibrational bands. An intense Raman band at 911 cm$^{-1}$ is attributed to vanadate (VO) symmetric stretching vibration, whereas anti-symmetric stretching vibrations are located between 713 and 830 cm$^{-1}$. The weak Raman bands at 380 and 410 cm$^{-1}$ are ascribed to vanadate (VO) bending vibrations. The Raman band observed at 240 cm$^{-1}$ is attributed to VOV bending vibration in CVO. The lattice CuO vibrational peaks are positioned at 65 and 115 cm$^{-1}$. Likewise, signature VO vibrational peaks of ZVO (402) are observed in two distinct regions, i.e., from 100 to 165 cm$^{-1}$ and 800 to 1000 cm$^{-1}$. Raman peaks at 257 and 326 cm$^{-1}$ appear due to symmetry-related vibrations, and peaks at 187, 220, and 375 cm$^{-1}$ are attributed to ZnO vibrations.

The Raman spectrum of CZVO 1:5 (406) exhibits mixed bands of ZVO (402) and CVO (404). The apparently combined bands in CZVO 1:5 (406) Raman spectrum caused a distinct blue-shift from 139 cm$^{-1}$ and 911 cm$^{-1}$ to 156 cm$^{-1}$ and 923 cm$^{-1}$ for bare CVO. Similarly, ZVO also showed a blue shift from 426 to 446 cm$^{-1}$. The interaction could possibly lead to the alignment of CVO (404) and ZVO (402) optical bands and the construction of Type (I) heterojunction between CVO (404) and ZVO (402), which is further supported by XPS analysis.

Figure 4B:
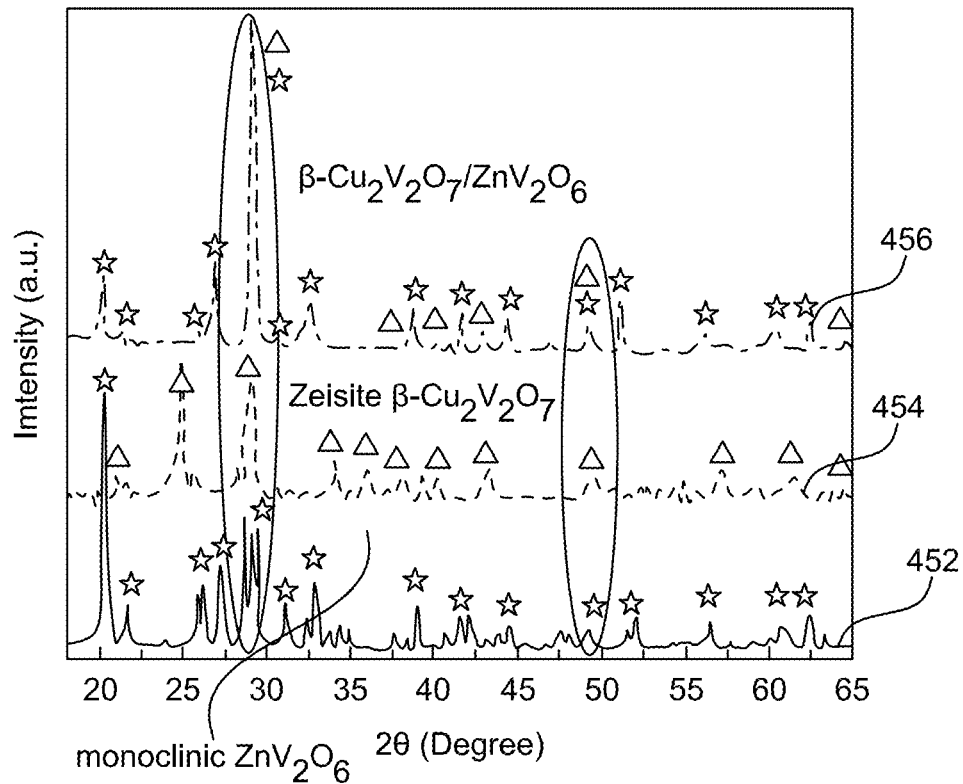
FIG. 4B illustrates x-ray crystallography (XRD) patterns of the layered CVO, ZVO NPs, and CZVO nanostructures, according to certain embodiments.

FIG. 4B illustrates the XRD patterns of as-synthesized ZVO (452), CVO (454), and CZVO 1:5 (456) samples. In the case of interlayered CVO (454), XRD patterns dominantly match with a highly crystalline zeisite Cu$_2$V$_2$O$_7$ (β-Cu$_2$V$_2$O$_7$) monoclinic crystal phase. The β-Cu$_2$V$_2$O$_7$ form dominantly exists at a temperature <500° C., which is in accordance with structure, as the annealing of CVO (454) is conducted at a temperature lower than 250° C. Similarly, the XRD patterns of ZVO (452) are preferentially matched with the reported JCPDS card no. 74-1262, corresponding to the monoclinic zinc vanadate (ZnV$_2$O$_6$) crystal phase, with few patterns from Zn$_2$V$_2$O$_7$ (JCPDS card no. 74-1262). Finally, the XRD patterns of CZVO 1:5 (456) arise from the combined CVO (454) and ZVO patterns (452). The highlighted peaks have appeared in all samples, which illustrate the intimidating coupling of CVO (454) and ZVO (452). Moreover, the matching dominant pattern at 2θ¼≈29° in all samples is the characteristic of vanadates, as also widely reported for BiVO$_4$. The appearance of analogous CVO (454) and ZVO (452) diffraction patterns with the support of morphological and vibrational analyses confirms the formation of CZVO hybrid (456).

Figure 5A:
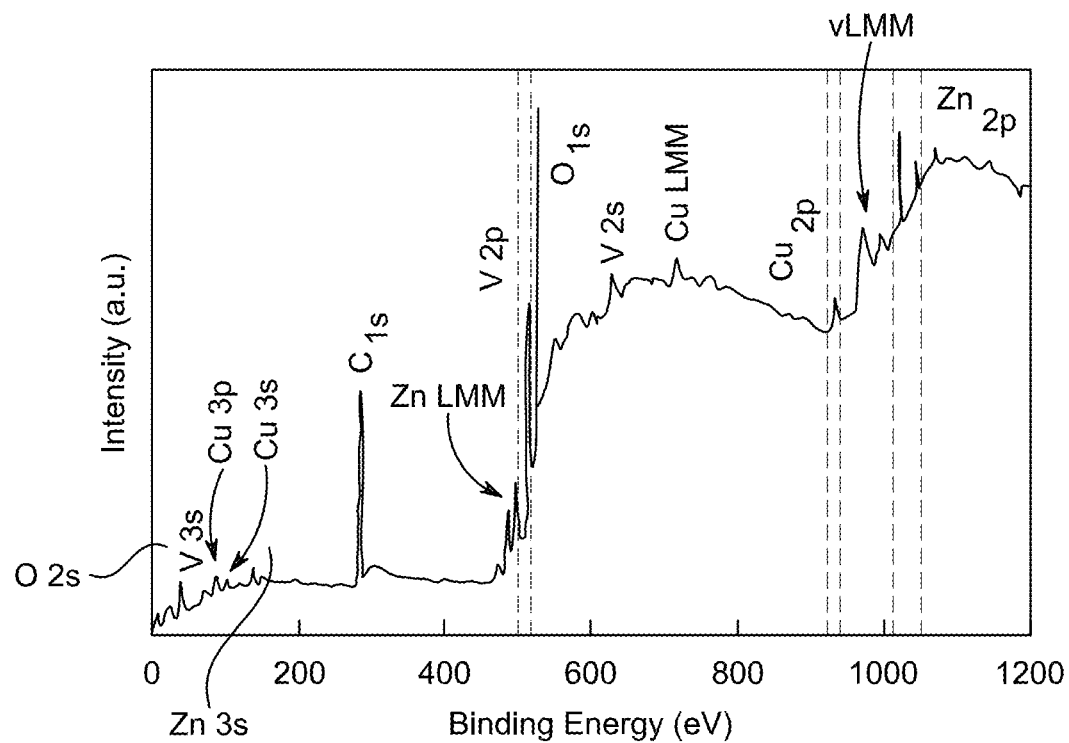
FIG. 5A illustrates a typical X-ray photoelectron spectroscopy (XPS) survey spectrum of the CZVO hybrid, according to certain embodiments.
Figure 5B:
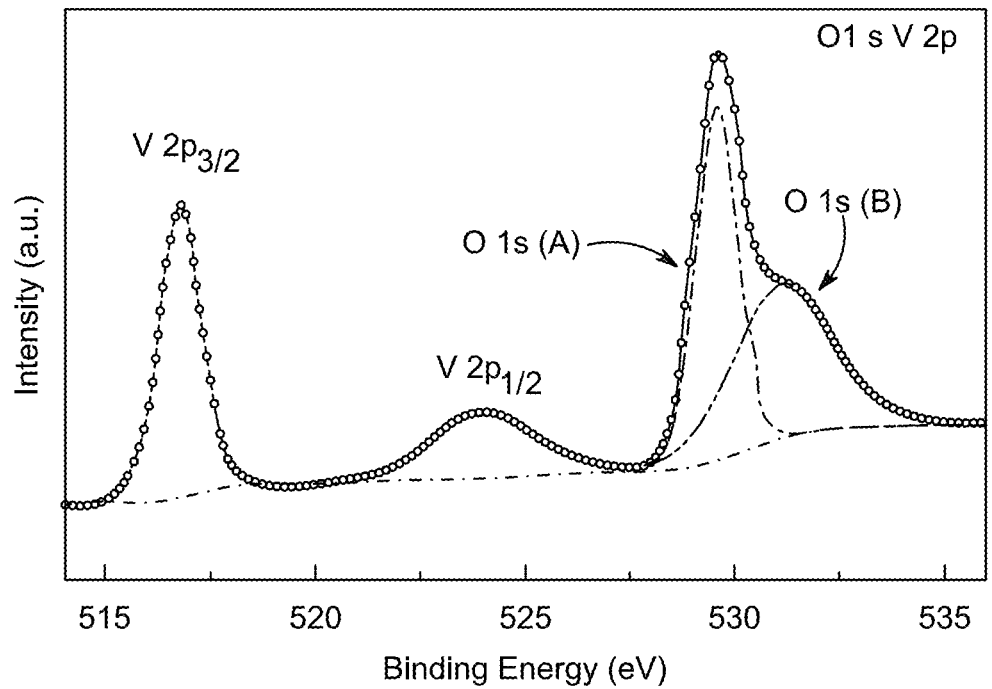
FIG. 5B illustrates the XPS data of V 2p and O 1s regions for the prepared heterojunction photocatalyst, according to certain embodiments.
Figure 5C:
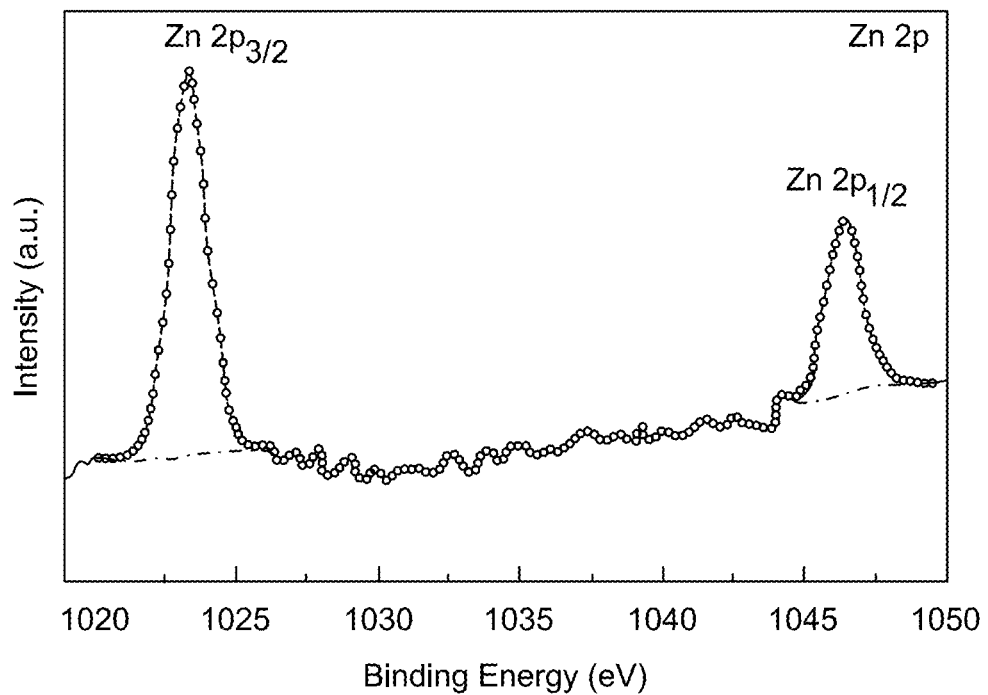
FIG. 5C illustrates the XPS data of Zn 2p regions for the prepared heterojunction photocatalyst, according to certain embodiments.
Figure 5D:
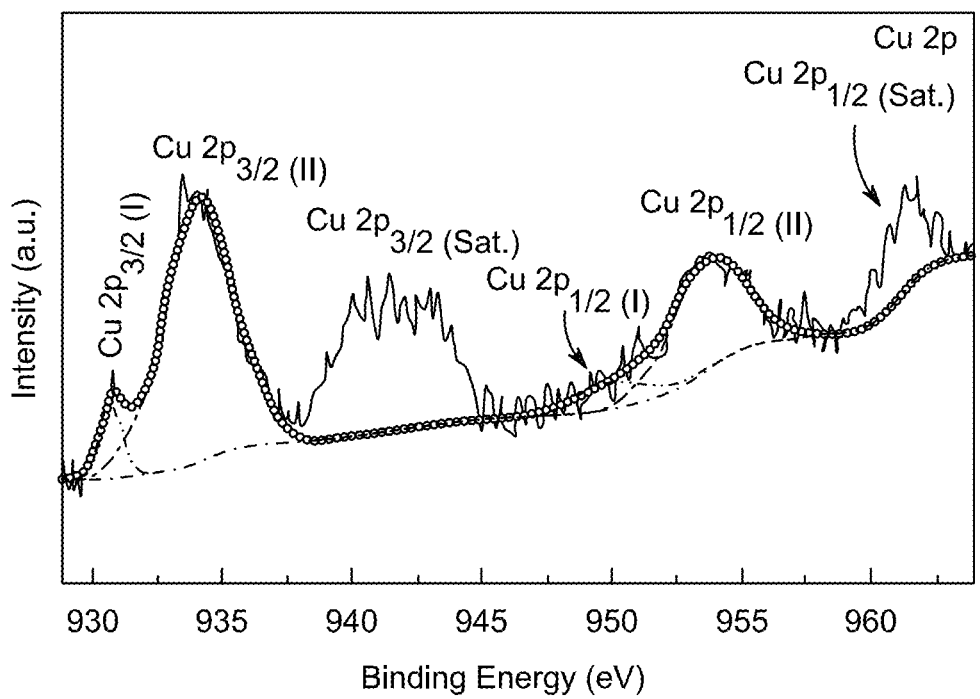
FIG. 5D illustrates the XPS data of Cu 2p regions for the prepared heterojunction photocatalyst, according to certain embodiments.

CZVO 1:5 is further investigated through XPS analysis to gain a deeper insight into the surface compositions and chemical states. Referring to FIG. 5A, the XPS survey spectrum depicted only the constituent elements (Zn, Cu, V, and O) on the surface of the CZVO 1:5 photocatalyst, confirming the purity of the sample, which supports XRD results. Detailed information is revealed from the high-resolution deconvoluted XPS spectra in the Zn, Cu, V, and O core-level regions. FIG. 5B illustrates the high-resolution XPS spectra of V 2p and O 1 s core. The V 2p spectrum was deconvoluted into two peaks at 516.5 (V 2p$_{3/2}$) and 524.0 (V 2p$_{1/2}$), corresponding to the oxidation state of V$^{5+}$. Similarly, the O 1 s spectrum is decomposed into two peaks O 1 s (A) and O 1 s (B) positioned at 529.6 and 531.2 eV, respectively. The O 1 s (A) peak could be assigned to lattice oxygen, and the O 1 s (B) may be ascribed to the oxygen defects or adsorbed oxygen. No significant OH subpeak is observed in deconvoluted oxygen, which indicates the anhydrous nature of the CZVO 1:5 sample, as also confirmed by the FT-IR (also referred in FIG. 9). FIG. 5C illustrates the high-resolution XPS spectra for the Zn 2p core-level region, the high-resolution Zn 2p spectrum is deconvoluted into two major peaks positioned at BEs of 1023.4 and 1046.4 eV, assigned to Zn 2p$_{3/2}$ and Zn 2p$_{1/2}$, respectively, confirming the presence of Zn$^{2+}$. FIG. 5D illustrates the XPS Cu 2p spectrum was fit into two pairs of peaks along with two shake-up satellite peaks. The two major peaks Cu 2p$_{3/2}$ (II) and Cu 2p$_{1/2}$ (II), at BEs of 934.0 and 953.9 eV, accompanied by their corresponding shake-up satellites Cu 2p$_{3/2}$ (Sat.) and Cu 2p$_{1/2}$ (Sat.), at BEs of 941.5 and 961.5 eV, respectively, are attributed to the Cu2$^+$ oxidation state. However, the two minor peaks Cu 2p$_{3/2}$ (I) (BE ¼ 930.8 eV) and Cu 2p$_{1/2}$ (I) (BE ¼ 950.1 eV) may be ascribed to the $Cu^{1+}$ state. The Zn 2p signal of the CZVO 1:5 photocatalyst exhibited a positive shift in the range of 1.1-2.6 eV toward higher BEs. However, a negative shift of 0.6-2.6 eV is noted in the Cu 2p peak compared with the corresponding values for pure CVO. The BE shifts for these components may be explained by a strong interaction between CVO and ZVO in the composite nanostructures. Theoretically, the increase in the BE indicates the reduction of the inner electron-shielding effect due to the decrease in the electron density of the outer electrons. In contrast, the increase in the electron density led to the decrease of the BE due to the enhanced inner electron-shielding effect. Therefore, the higher and lower BE shifts of the Zn 2p and Cu 2p signals, respectively, were attributed to the charge transfer from ZVO to CVO at the heterostructure interface. The XPS results, along with that of the SEM, Raman, and FT-IR findings, evidence the successful fabrication of CZVO hybrid with facilitated charge transfer through heterojunction formation.

Figure 6A:
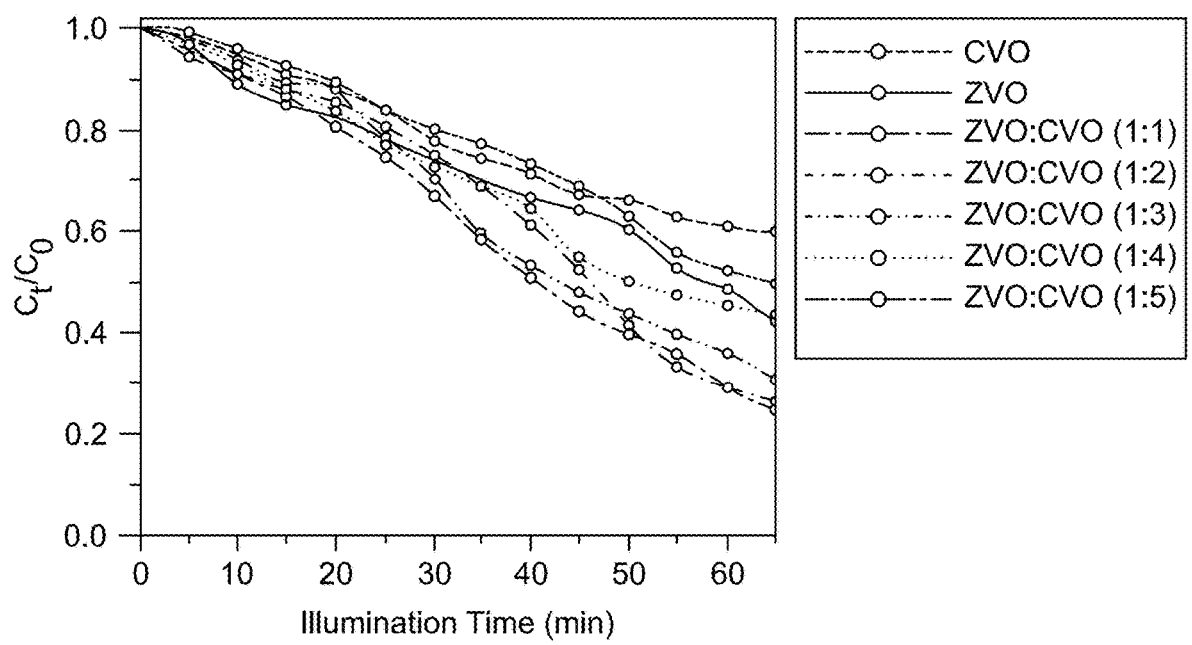
FIG. 6A illustrates a photodegradation of a methylene blue (MB) dye at various ZVO:CVO ratios by keeping ZVO weight constant, according to certain embodiments.
Figure 6B:
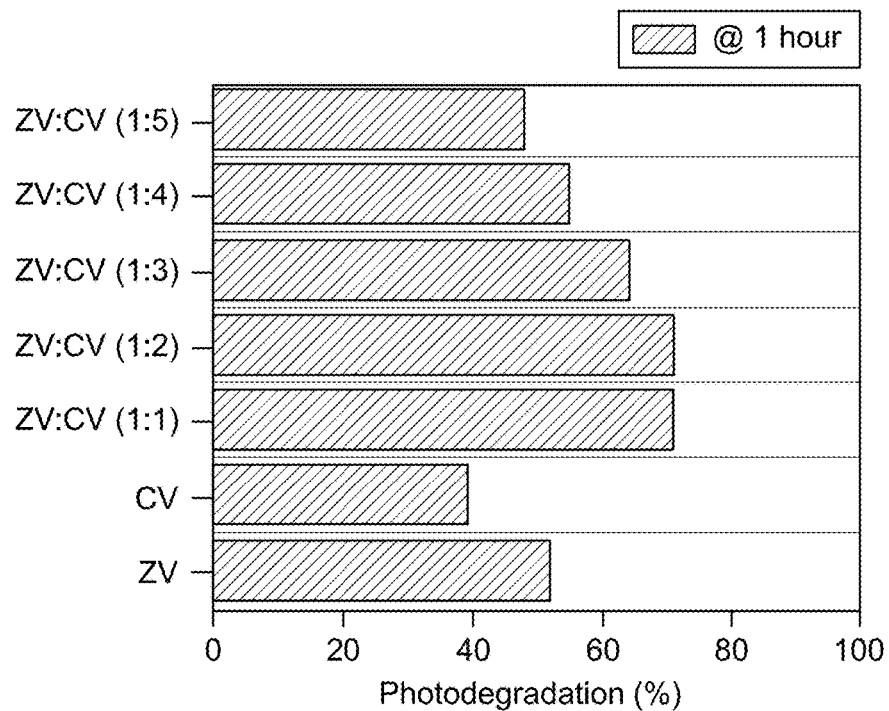
FIG. 6B illustrates the photodegradation of the methylene blue (MB) dye at various ZVO:CVO ratios by keeping ZVO weight constant, according to certain embodiments.
Figure 6C:
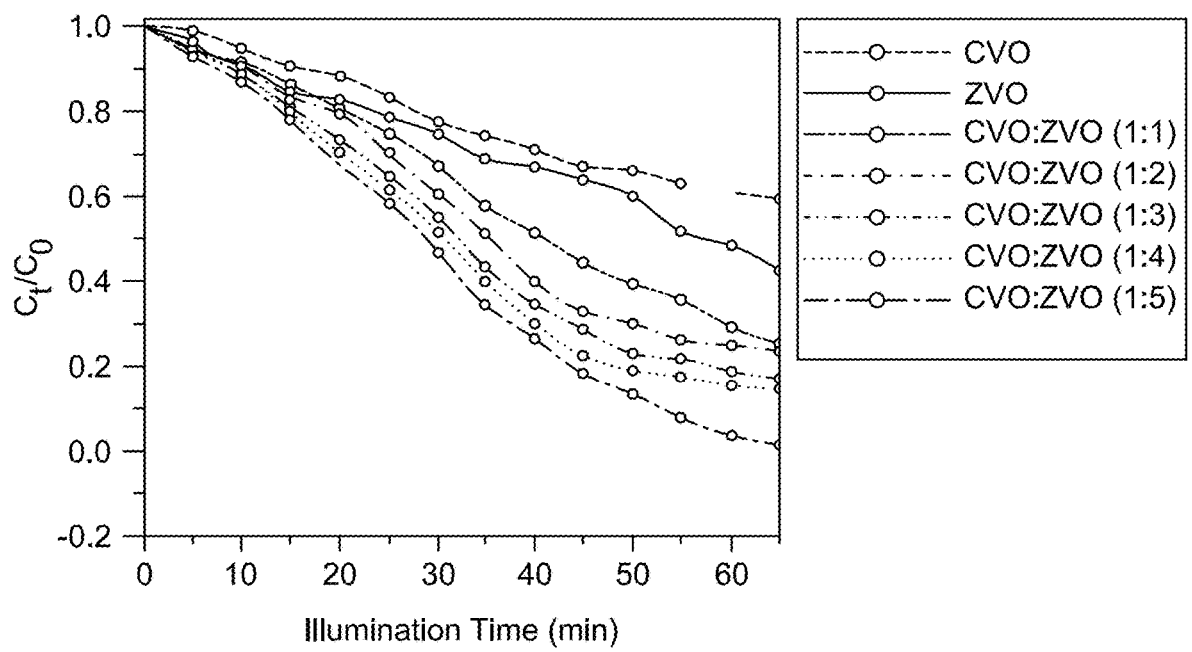
FIG. 6C illustrates the photodegradation of the methylene blue (MB) dye at various ZVO:CVO ratios by keeping CVO weight constant, according to certain embodiments.
Figure 6D:
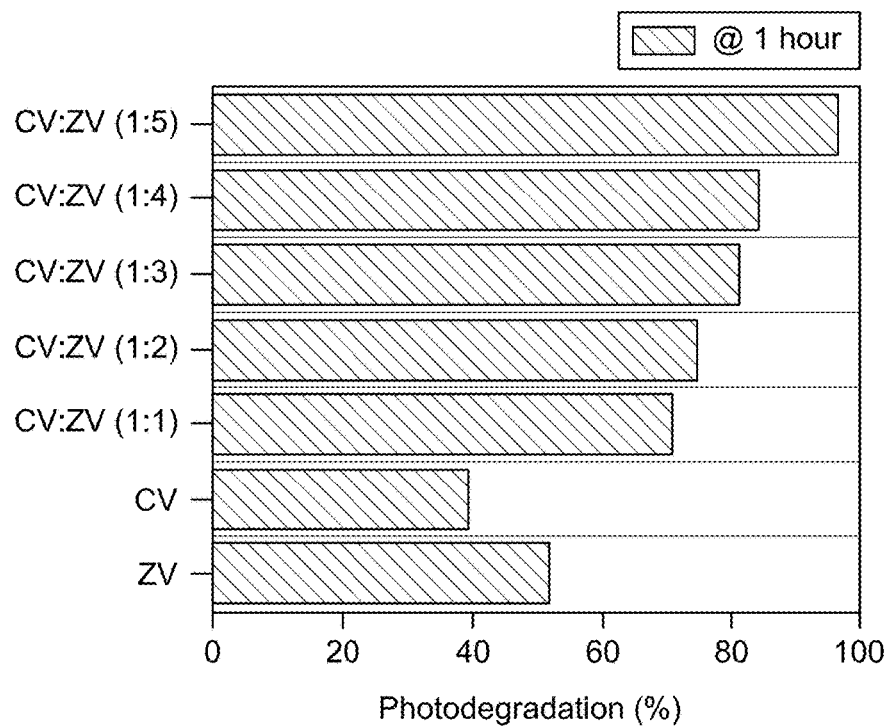
FIG. 6D illustrates the photodegradation of the methylene blue (MB) dye at various ZVO:CVO ratios by keeping CVO weight constant, according to certain embodiments.
Figure 6E:
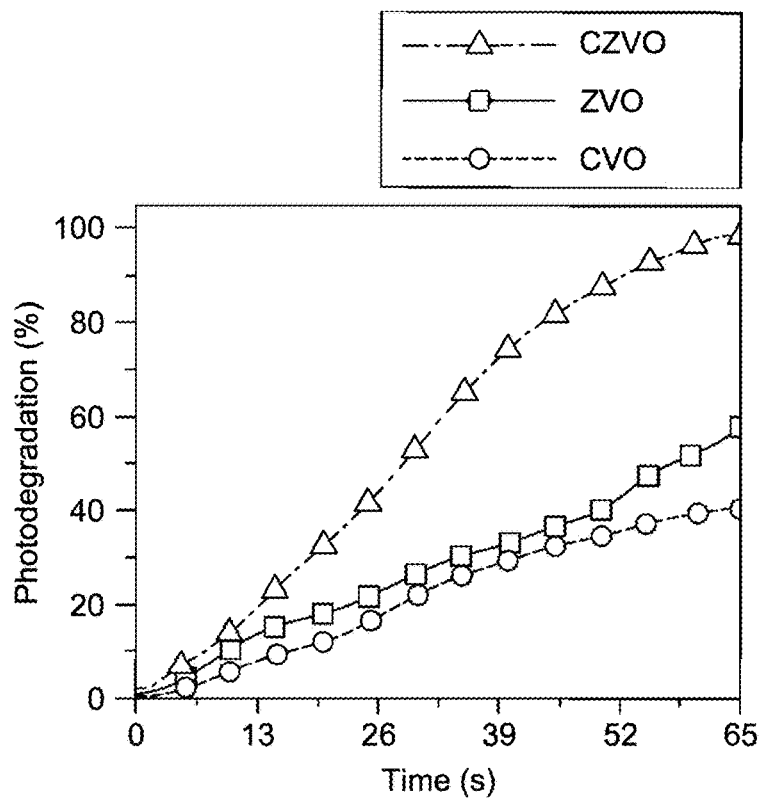
FIG. 6E illustrates the percent photodegradation of CVO, ZVO, and CZVO, according to certain embodiments.
Figure 8:
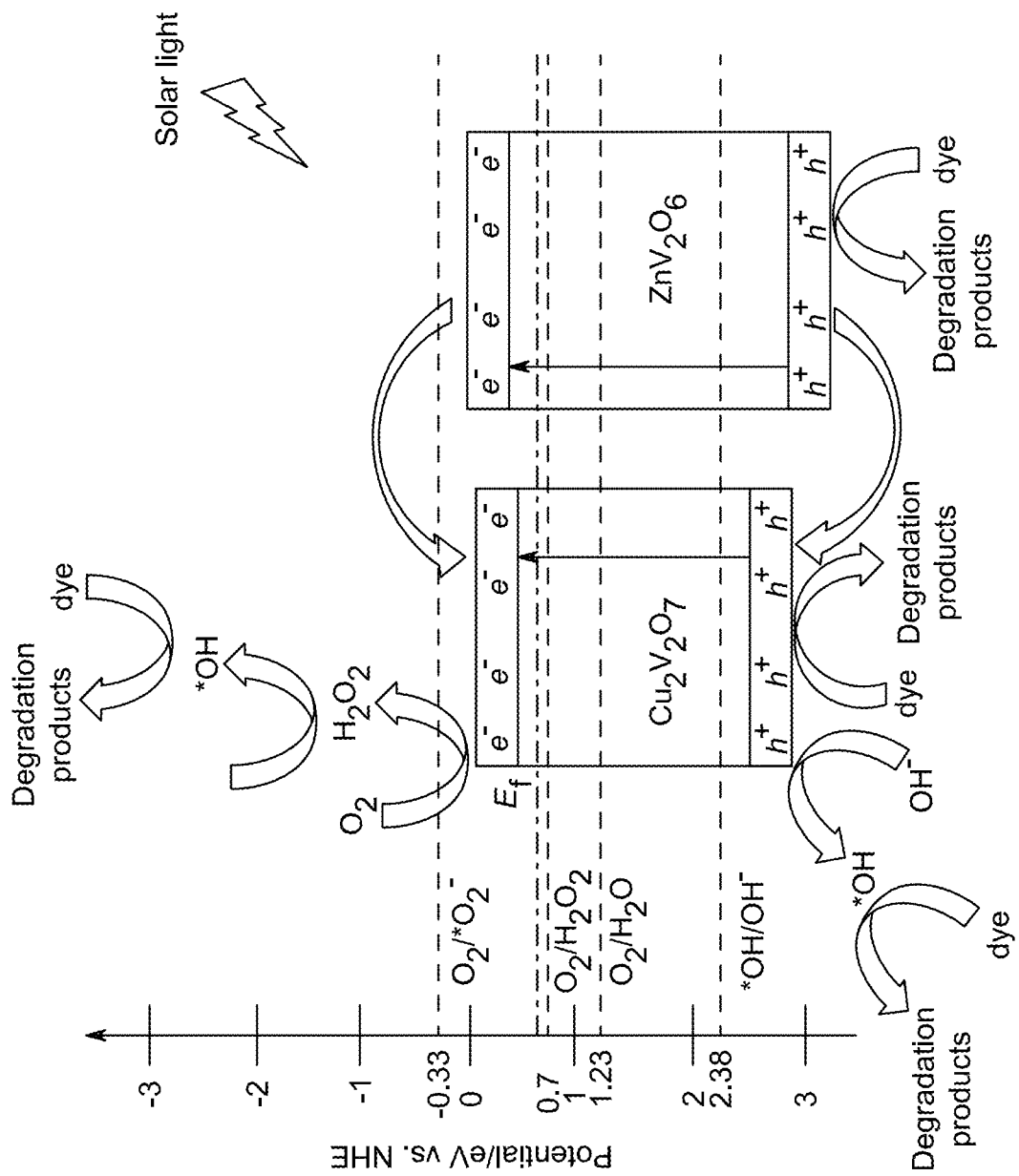
FIG. 8 illustrates a photocatalytic mechanism of the type (I) CZVO heterojunction, according to certain embodiments.

Dyes are abundantly added organic contaminants in the aquatic environment due to them extensive usage in the textile and related industries, and thus using new materials for their removal is always accountable. FIG. 8 illustrates the photocatalytic dye degradation performance of CVO, ZVO, and CZVO. MB is chosen as a model dye for this purpose. In each experiment, an amount of MB is allowed to be adsorbed on the surface of FTO-deposited films in the dark. At first, the photocatalytic capability of layered CVO and ZVO NPs for the MB dye degradation is individually evaluated. After the adsorption step in the dark, the films were exposed to continuous simulated radiation for about 1 h (1 Sun). The quantification of periodically collected samples through Equation (1) yields the dye photodegradation efficiency of 57.6 and 40.5% for bare ZVO and CVO samples, respectively. These results demonstrate the capacity of bare CVO and ZVO toward photodegradation of MB, which can be attributed to their suitable optoelectrical properties. Comparatively, ZVO displayed high degradation efficiency that can be attributed to more charge absorption and sufficient charge separation. FIGS. 6A-6E illustrate enhanced capacity of CVO and ZVO, it was tried to develop their hybrid having different wt. % ratios of each component. Initially, the incremental variation of CVO concentration against ZVO showed a negative impact on the photodegradation performance of the CZVO heterojunction as 1:1 (CVO:ZVO) sample delivers the best degradation of 74.9% in 65 min. However, the dye degradation efficiency is continuously reduced and reached 50.4% at the 5:1 (CVO: ZVO) ratio. The decreasing photodegradation rate might be due to 1) more concentration of CVO layers that suppressed semiconducting properties of ZVO by blocking their photon trapping surface, 2) the small bandgap and increasing concentration of CVO leading to superior hole/electron recombination, and 3) photo-corrosion of CVO under continuous irradiation, which can cause weathering and mechanical deterioration of the film. These results suggest that for the development of trimetallic CZVO hybrid, the recommended amount (by wt. %) is CVO ≤ZVO (FIGS. 6A, 6B and 6E). Therefore, the mixing pattern was reversed by incrementally varying ZVO concentration against CVO. Accordingly, an accelerated photodegradation trend was observed until a 1:5 wt. % ratio, i.e., CVO:ZVO (1:5). The MB photodegradation efficiency of this system reached 98.7% after a mere 65 min (FIGS. 6C-6E). The tremendous photodegradation in such a short time suggests that the issues mentioned earlier were successfully tackled due to the accomplishment of combinations, i.e., CZVO 1:5.

To understand the contribution of active species and further support the photocatalytic mechanism, active species trapping experiments are conducted using the CZVO 1:5 sample. In these experiments, the contribution of .OH, $h^+$ VB, $O_2$., and e CB to the photocatalytic degradation of MB was examined using 1.04 mol $dm^3$ isopropyl alcohol (IPA), ammonium oxalate (AO), benzoquinone (BZQ), and Cr(VI)-ion solutions as .OH, $h^+$ VB, $O_2$., and e CB scavengers, respectively. Results obtained from the scavenging experiments in FIG. 6F identified $h^+$ VB and .OH as the main reactive species in the photodegradation of MB under visible light irradiation, as the photodegradation efficiency of CZVO 1:5 sample was significantly quenched to 7% and 18% by the addition of IPA and AO, respectively. In contrast, the addition of BZQ and Cr(VI) could not quench the degradation curve significantly under light and hence confirmed that $O_2$. and e CB have not taken part in the photodegradation of dyes.

Figure 7A:
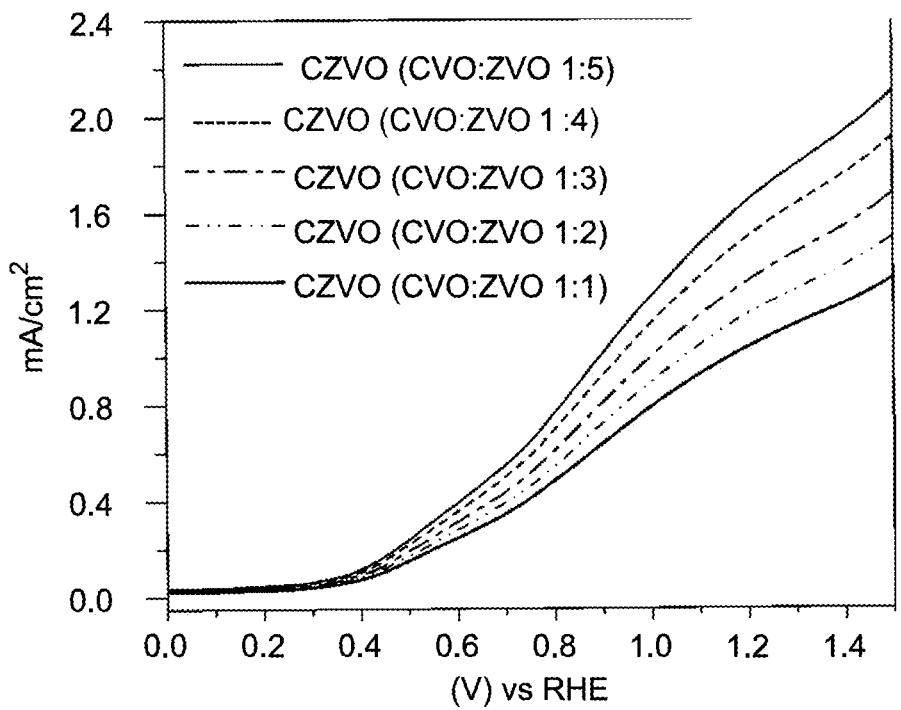
FIGS. 7A-7H illustrate a photo-electrochemical (PEC) water-splitting performance of CVO, ZVO, and CZVO 1:5 photoanodes.
Figure 7B:
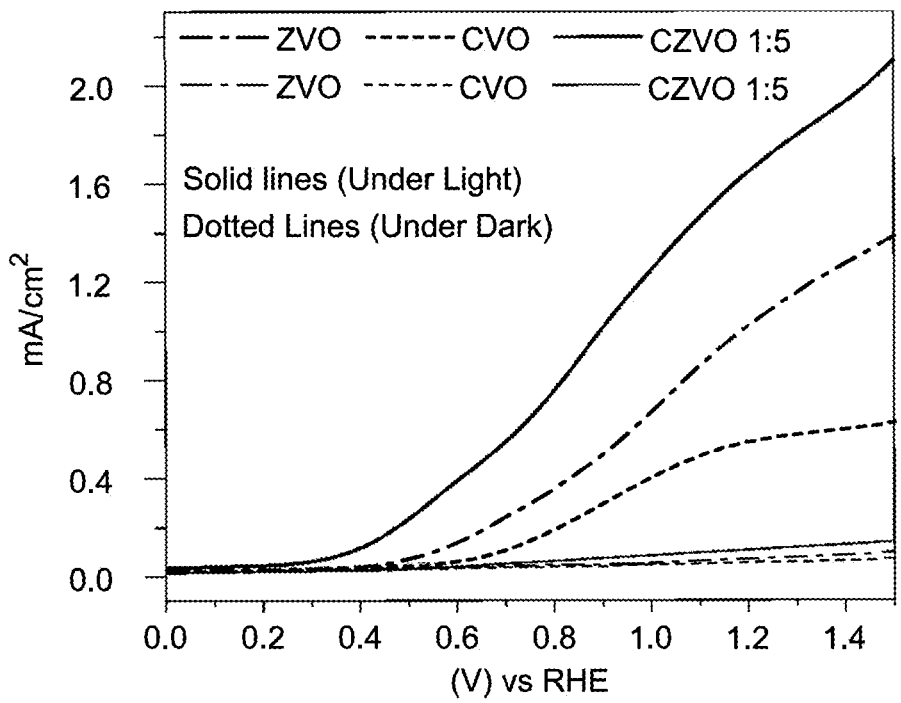

CVO, ZVO, and CZVO are assumed to be active for PEC applications due to their excellent optoelectrical characteristics, as witnessed during photodegradation. Photoanodes were fabricated using the dip-coating method over FTOs. FIG. 7A shows photocurrent-voltage (I-V) curves acquired from CZVO photoanodes by varying the CVO:ZVO wt. % in the order 1:1, 1:2, 1:3, 1:4, and 1:5. The comparative assessment of I-V curves suggests that CVO:ZVO ¼ 1:5 (CZVO 1:5) photoanode shows the maximum $I_{ph}$ compared to other combinations. The high $I_{ph}$ of CZVO 1:5 photoanode can be attributed to the availability of more photoactive sites due to the distribution of ZVO NPs over/beneath CVO layers. This intimate contact could synchronize and facilitate the charge transfer from ZVO to CVO, as evidenced by the XPS findings It is important to state that the remaining combinations generate less photo-current density, which means that the ZVO ratio is less than the 1:5 ratio, and hence the photoanodes were unable to trap the maximum photons compared with CZVO 1:5. Comparative IV results obtained from bare CVO, ZVO, and CZVO 1:5 photoanodes, are shown in FIG. 7B. The comparative IV plots show that the $I_{ph}$ of CZVO 1:5 reaches 1.78 mA $cm^{-2}$ at 1.23 $V_{RHE}$, whereas bare CVO and ZVO photoanodes generate lower photo-current densities of 0.57 and 1.15 mA $cm^{-2}$, respectively. Also, it can be observed that the significant cathodic onset potential shift of CVO and ZVO from 538 $mV_{RHE}$ and 649 $mV_{RHE}$ to 332 $mV_{RHE}$ in the CZVO 1:5 photoanode. The apparent enhancement in the $I_{ph}$ and the cathodic onset potential shift in the case of CZVO 1:5 photoanode suggests that less potential energy is required to oxidize water. Moreover, the perfect orientation of optical bands is not only attributed to significant solar light trapping to generate photoexcited charges (electron/hole pairs) but also helps in charge transfer facilitation across the optical boundaries due to the intimate contact of ZVO NPs with layered CVO. More importantly, the presence of copper atoms within the sample certainly impacted the electrochemical performance of CZVO photoanode, whereas zinc contributes towards the semiconducting behavior of CZVO 1:5. It could be assumed that the photoinduced electrons in the conduction band (CB) of ZVO are injected to CVO via the Zn—O—Cu bonds. As a result, the CVO acts as a charge/electron collector. The electrons then transfer to the counter electrode to generate $H_2$. The synergistic effect between CVO and ZVO can significantly restrain the recombination rate of photoinduced electron hole pairs in ZVO, thus leading to superior PEC performance compared with bare CVO and ZVO photoanodes. There is a lower dark current density observed in all cases, which signifies their dominant semi-conducting nature. Further the CZVO photoanodes showed a higher dark current density, demonstrating superior charge transfer. In comparison, the bare CVO and ZVO photoanodes showed lower photo-current densities and high onset potentials. CVO has a strong conductive copper atom, yet poor light trapping and severe charge recombination could be the possible issues that impact its overall performance. In contrast, ZVO contains Zn atom bonded with oxygen, which is known for photon trapping; however, its conductivity is less than the CVO photoanode.

Figure 7C:
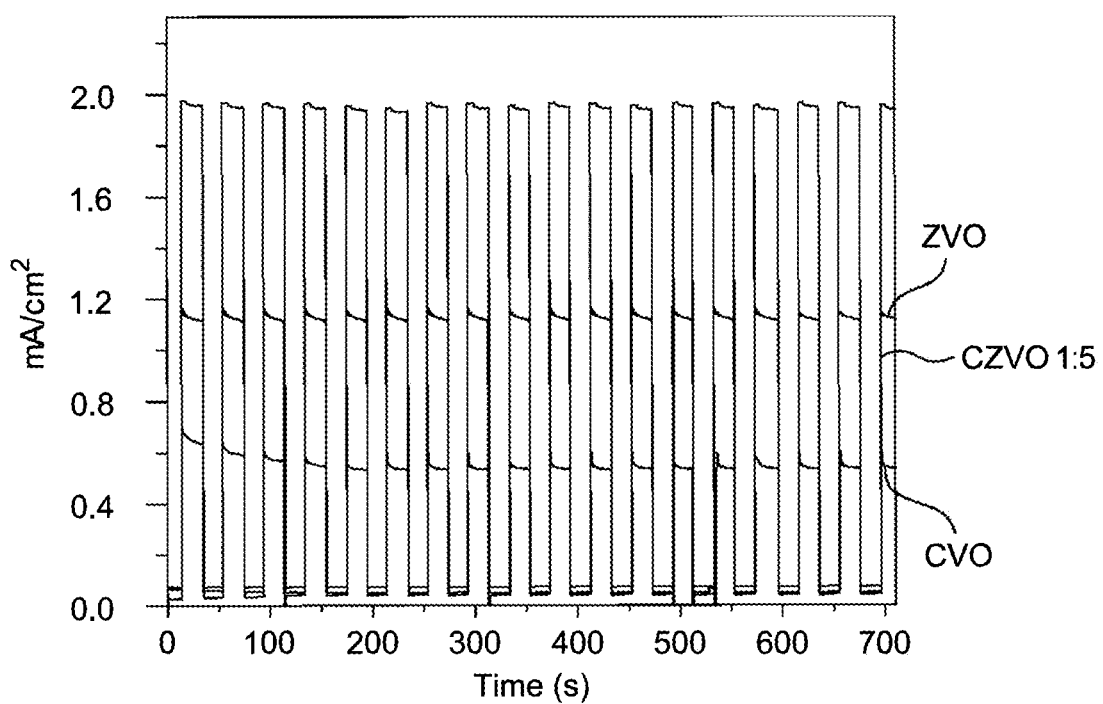
Figure 7D:
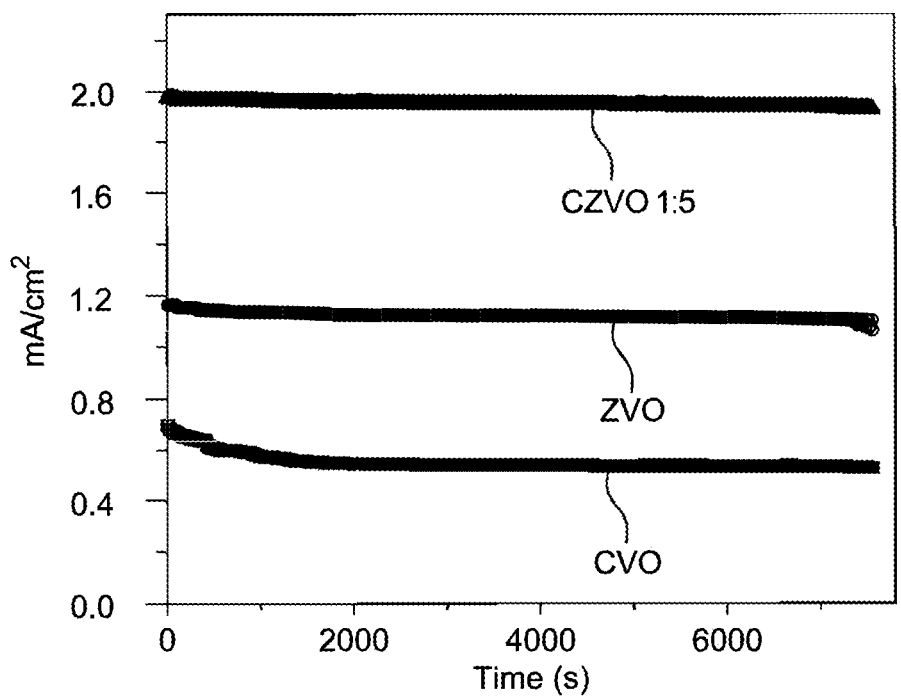

FIG. 7C illustrates the photoanodes demonstrate a prompt and reproducible transient photo-current when subjected to regular simulated chopped light at 1.30 $V_{RHE}$. The generation of anodic photo-current upon light shining suggests that CVO, ZVO, and CZVO 1:5 photoanodes are efficiently photoactive in the order CVO<ZVO<CZVO 1:5. The generated photo-current in the case of CZVO 1:5 is ≈3.11 and ≈1.55 times that of CVO and ZVO photoanodes, respectively, which can be attributed to prompt solar absorbance, stable photo-response, facile charge generation, and transfer at the interface of CZVO 1:5 photoanode. FIG. 7B shows the peak transient photo-current values are similar for all photoanodes to that obtained through the I-V analysis at 1.30 $V_{RHE}$. These results further confirm the efficient light trapping, sufficient photo-exciton generation, and minimal charge recombination in the case of CZVO 1:5 photoanodes due to preferable optical band alignment after the mixing of CVO and ZVO. To further support the photostability claim of the photoanodes, FIG. 7D illustrates a comprehensive photo-current time (I-t) analysis under continuous solar irradiation for an extended time, and the results. In the case of CVO photoanode, a steep decrease in photo-current followed by a relatively stable photo-current was observed. The photo-current decreases from 0.71 to 0.53 mAcm$^{-2}$ after 7600 s, which is a ≈27% decline in the initial photo-current density. A slight reduction in $I_{ph}$ suggests that CVO is prone to photo-corrosion due to a higher charge recombination effect. Comparatively, the CZVO 1:5 and ZVO photoanodes sustained the generated $I_{ph}$ more efficiently and briefly. The ZVO $I_{ph}$ decreased from 1.16 to 1.08 mAcm$^{-2}$, which was about decline from the initial photo-current after 7600 s. Finally, the CZVO 1:5 photoanode showed superior photo-current sustainability and declined only 1% after the same period of light exposure. These results confirmed the photostable nature of ZVO, which could be related to suppressed charge recombination and facile interfacial charge transfer.

Figure 7E:
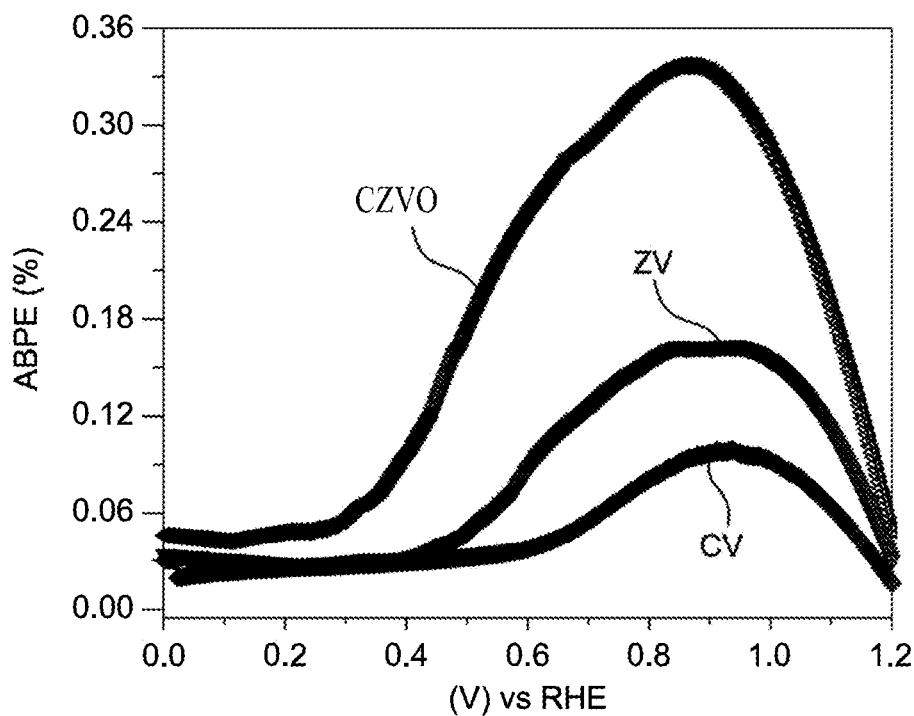
Figure 7F:
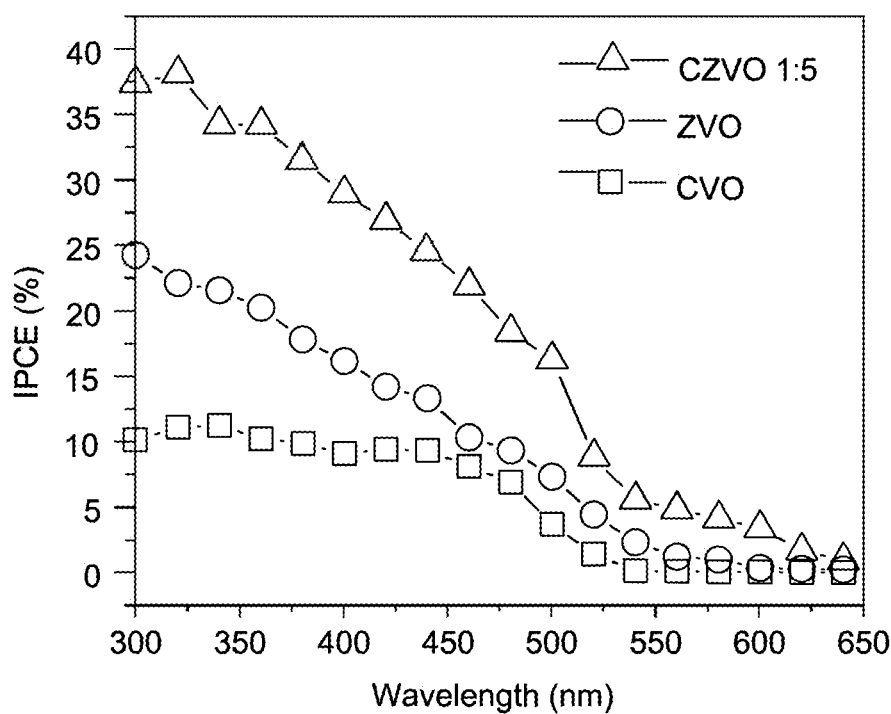
Figure 7G:
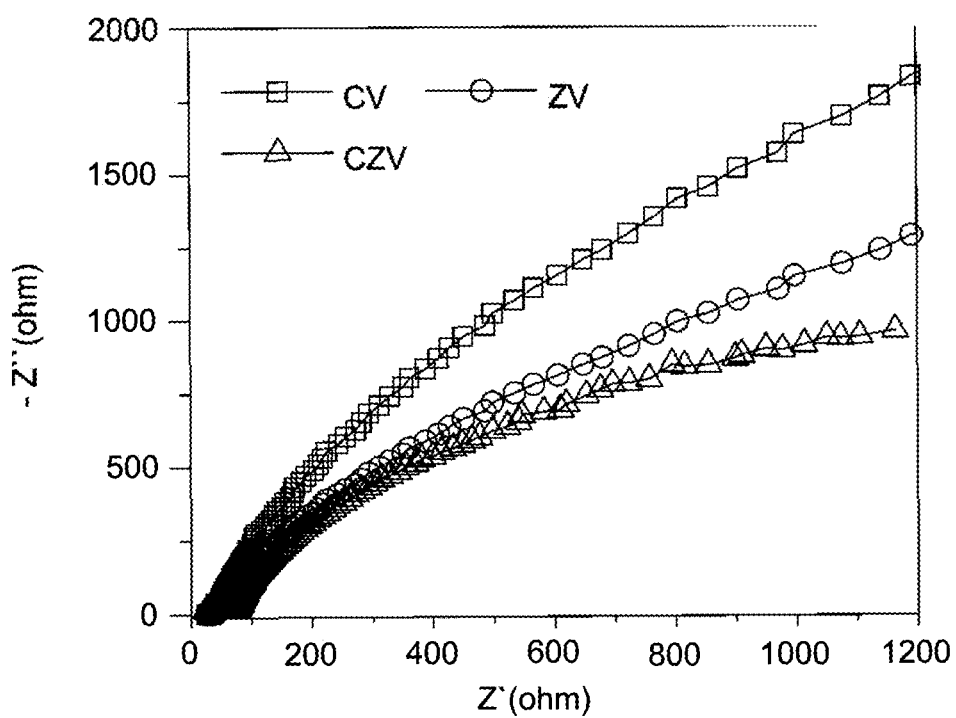

The photo-efficiency of CVO, ZVO, and CZVO 1:5 photoanodes in terms of % IPCE and % ABPE was determined by Equations (2) and (3). FIG. 7E shows % ABPE for all photoanodes as a function of the applied bias potentials. The CZVO 1:5 photoanode attains the highest efficiency of 0.34% at 0.9 $V_{RHE}$, which was almost double that of ZVO (% ABPE=0.16%) and 3.4 times that of CVO (% ABPE=0.1%). Furthermore, the solar harvesting of any photoanode was quantitatively investigated by incident photon-to-current conversion efficiency (IPCE) measurement. The as-fabricated photoanodes were examined using the spectral IPCE device from a wavelength range from 300 to 650 nm at an applied bias of 1.3 $V_{RHE}$ using Equation (2). FIG. 7F shows that the CZVO 1:5 film increased % IPCE as compared with that of CVO and ZVO. The % IPCE values of CZVO 1:5 photoanodes reached 37.93% at ≈320 nm, which is about 3.51 and 1.7 times more than those of CVO (IPCE320 nm¼=≈10.8%) and ZVO (IPCE320 nm ¼=≈22.15%). From the % IPCE results, it may be realized that CZVO features the widest solar light-harvesting window, i.e., from 300 nm (IPCE=37.13%) to 650 nm (IPCE=0.7%). In comparison, the solar light-harvesting window for CVO and ZVO photoanodes started from 300 nm and reached zero IPCE at 542 and 599 nm, respectively. These findings show that introduction of an appropriate amount of ZVO onto CVO layers in CZVO can realize the highly efficient generation, separation, and transfer of charge carriers, which successfully enhanced the $I_{ph}$ due to efficient solar light harvesting at the lower-onset potential energy. Similar FIG. 7G shows the tendencies which are observed in the EIS results. The approximate arc radius of CZVO 1:5 on the EIS Nyquist plot is smaller than that of CVO and ZVO, which indicates that lower resistance has been offered by CZVO 1:5 to charge transfer due to suitable interfacial kinetics. Moreover, the CZVO heterojunction possesses two semicircles (a low-frequency small semicircle and a high-frequency larger semicircle), which can be associated with two-phase material formation, as also observed in the case of $Fe_2O_3/TiO_2$ and $SiO_2/\alpha-Fe_2O_3$. The bare $Fe_2O_3$ in both cases possess a single semicircle; however, another circle arises when it forms a heterojunction.

Figure 7H:
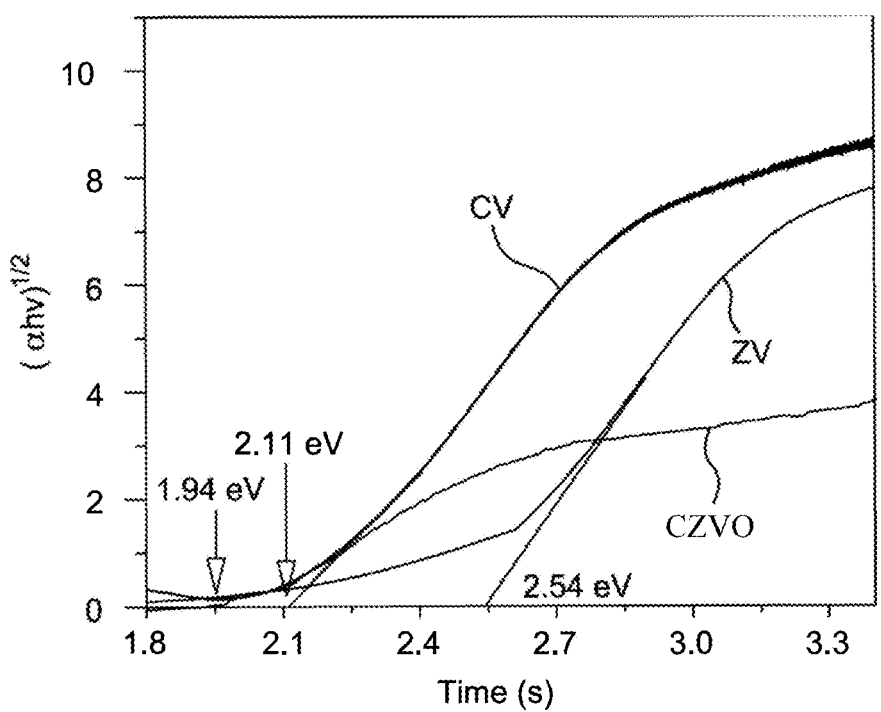

FIG. 7H shows proof of photo-excitons generation and charge transfer as provided by optical analysis, CZVO 1:5 has a lower bandgap (1.94 eV) than CVO (2.11 eV) and ZVO (2.54 eV). The lower bandgap of CZVO 1:5 suggests that smaller photon energy is required to generate electron/hole pairs, whereas the proper alignment of the CVO and ZVO optical bands facilitates the charge transfer of these photo-excitons and hence suppresses the charge recombination, which leads to higher PEC performance. Severe structural and interfacial changes occurred after the long-term stability test due to various chemical reactions that occurred due to high energy kinetics and recombination phenomena. The XRD of the samples after long-term stability in FIG. 10 suggests the arrival of new peaks, which means that the expected chemical changes occurred in the CZVO 1:5 samples after photostability test measurements. This is because the negative potential of the CB minimum signifies a strong reduction capability, whereas the positive potential of the valence band (VB) maximum indicates a strong oxidation capability. The band-edge positions of CVO and ZVO can be calculated based on the following empirical formulae.]

$$E_{CB}=\chi-E_e-0.5E_g \quad (5)$$

$$E_{VB}=E_{CB}+E_g \quad (6)$$

where $E_{CB}$ and $E_{VB}$ are the CB and VB edge potentials, $E_e$ is the energy of free electrons on the hydrogen scale (4.5 eV vs normal hydrogen electrode (NHE)), $E_g$ is the bandgap energy, and x is the absolute electronegativity of the semiconductor, defined as the geometric mean of the absolute electronegativities of the constituent atoms obtained by the following formula.

$$\left(\chi = \prod_{k=1}^{p} \chi_k\right)^{\frac{1}{p}} \quad (7)$$

where p is the number of atoms in the crystal. As the experimental electronegativity values of Cu, Zn, V, and O are 4.48, 4.45, 3.6, and 7.54 eV, respectively, the absolute electronegativities of CVO and ZVO were calculated to be 5.99 and 6.03 eV, respectively. Estimated from the UV-visible diffuse reflectance spectroscopy (DRS) spectra in FIG. 7H, $E_g$ values of CVO and ZVO are 2.11 and 2.54 eV, respectively. Consequently, after putting the values in Equation (5) and (6), the VB and CB of CVO and ZVO were calculated to be 0.44 and 0.26 eV, and 2.55 and 2.80 eV, respectively, which were in good agreement with available reported values.

Based on the earlier findings, it was apparent that both CB and VB edges of CVO are enveloped within the bands of ZVO, which suggests the formation of Type (I) heterojunction at electrode interfaces. FIG. 8 shows a possible photocatalytic mechanism was used to demonstrate the significant photocatalytic performance of the CZVO 1:5 heterojunction photocatalyst. Upon light illumination, both CVO and ZVO may be excited to generate photoinduced electrons and holes in their respective CB and VB due to their excellent light-capturing capabilities. Due to a more negative CB potential of ZVO, the photoinduced electrons on the CB can be easily transferred to the CB of CVO via the heterojunction interface. The photoinduced electrons on the CB of CVO could not produce $.O_2^-$ from the dissolved $O_2$ due to the more positive reduction potential of $O_2/O_2^-$ (0.33 eV vs NHE). Nevertheless, as the reduction potential of $O_2/H_2O_2$ is almost 0.69 eV versus NHE, the electrons on the CB of CVO can react with $O_2$ and $H^+$ to generate the hydroxyl radicals (.OH). A similar observation was reported in related binary heterojunctions such as $ZnO/V_2O_5$ and $Ag_3VO_4/WO_3$.

Figure 6F:
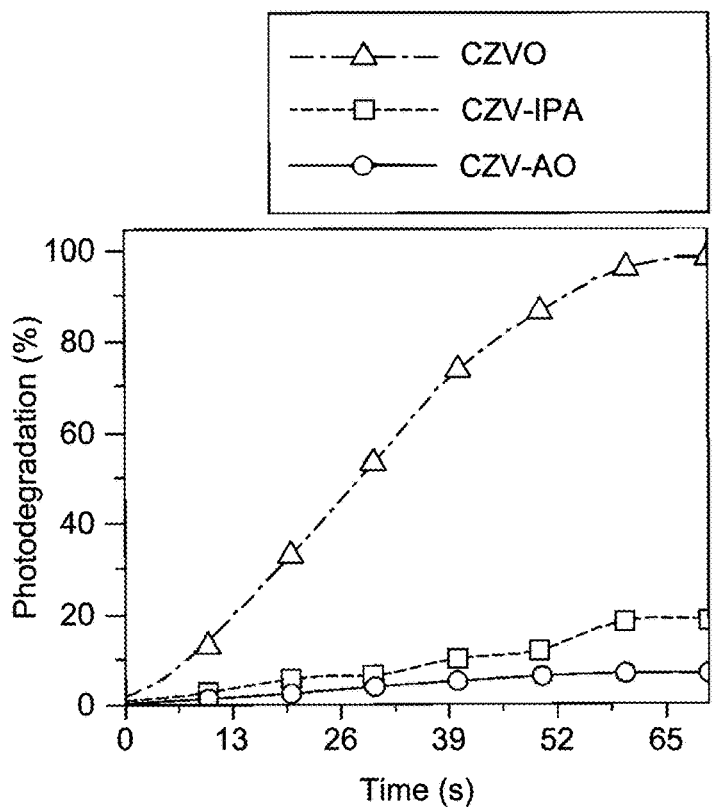
FIG. 6F illustrates the charge-trapping experiment, according to certain embodiments.

Meanwhile, holes on the VB of ZVO could be injected into VB of CVO and oxidize $OH^-$ to produce .OH (.OH/$OH^-$ is 2.38 eV vs. NHE). In this way, .OH radicals, which are reactive oxidative species, are formed to degrade the MB dye. In addition, the photoinduced holes can react immediately with MB. Thus, both .OH and $h^+$ radicals are responsible for the degradation of MB. FIG. 6F shows the formation of .OH and $h^+$ radicals and their predominant reactivities are confirmed by the active species-trapping experiments. The detailed mechanism for MB dye violet degradation involves the following steps.

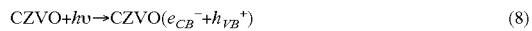
$$CZVO+h\upsilon \rightarrow CZVO(e_{CB}^- + h_{VB}^+) \quad (8)$$

$$ZVO(e_{CB}^-) \rightarrow CVO(e_{CB}^-) \quad (9)$$

$$ZVO(h_{VB}^+) \rightarrow CVO(h_{VB}^+) \quad (10)$$

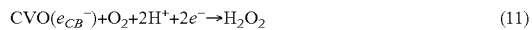
$$CVO(e_{CB}^-)+O_2+2H^++2e^- \rightarrow H_2O_2 \quad (11)$$

$$H_2O_2+e^-+h\upsilon \rightarrow \dot{O}H+OH^- \quad (12)$$

$$CVO(h_{VB}^+)+OH^- \rightarrow \dot{O}H \quad (13)$$

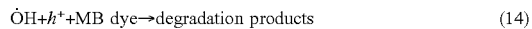
$$\dot{O}H+h^++MB\ dye \rightarrow degradation\ products \quad (14)$$

Though the photoinduced electron hole pairs migrate from ZVO to CVO via the interface, the different migration rates of these charge carriers lead to efficient separation of the photoinduced electrons and holes at the heterojunction interface. The small arc radius on the EIS Nyquist plot (FIG. 7G) and high $I_{ph}$ CZVO 1:5 photoanode compared with bare CVO and ZVO samples evidence the effective separation of the photoinduced electron hole pairs and the high-speed charge transfer at the electrode/electrolyte interface. Moreover, time-resolved fluorescence (TRF) in FIG. 11, also supports the superior optical behavior of CZVO in terms of the longer lifetime of generated photo-excitons. Thus, in light of the obtained results, it could be emphasized that the Type (I) band alignment was constructed between interlayered CVO and ZVO NPs in favor of the efficient separation and transfer of the photoinduced charges, which led to the enhancement of the photocatalytic degradation of MB dye.

In order to understand the reaction kinetics at the electrode/electrolyte interface and the interactions of the intermediates with the photocatalyst surface, it was critical to understand the OER mechanism over the heterostructured photocatalyst. Given that the PEC measurements were carried out in a neutral medium, CZVO heterojunction could track the following steps for OER.

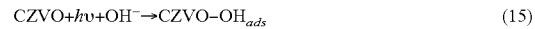
$$CZVO+h\upsilon+OH^- \rightarrow CZVO-OH_{ads} \quad (15)$$

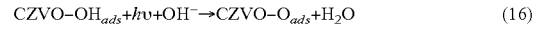
$$CZVO-OH_{ads}+h\upsilon+OH^- \rightarrow CZVO-O_{ads}+H_2O \quad (16)$$

$$CZVO-O_{ads}+h\upsilon \rightarrow CZVO+O_2 \quad (17)$$

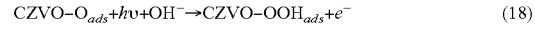
$$CZVO-O_{ads}+h\upsilon+OH^- \rightarrow CZVO-OOH_{ads}+e^- \quad (18)$$

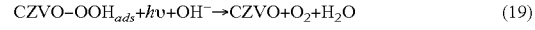
$$CZVO-OOH_{ads}+h\upsilon+OH^- \rightarrow CZVO+O_2+H_2O \quad (19)$$

Figure 9:
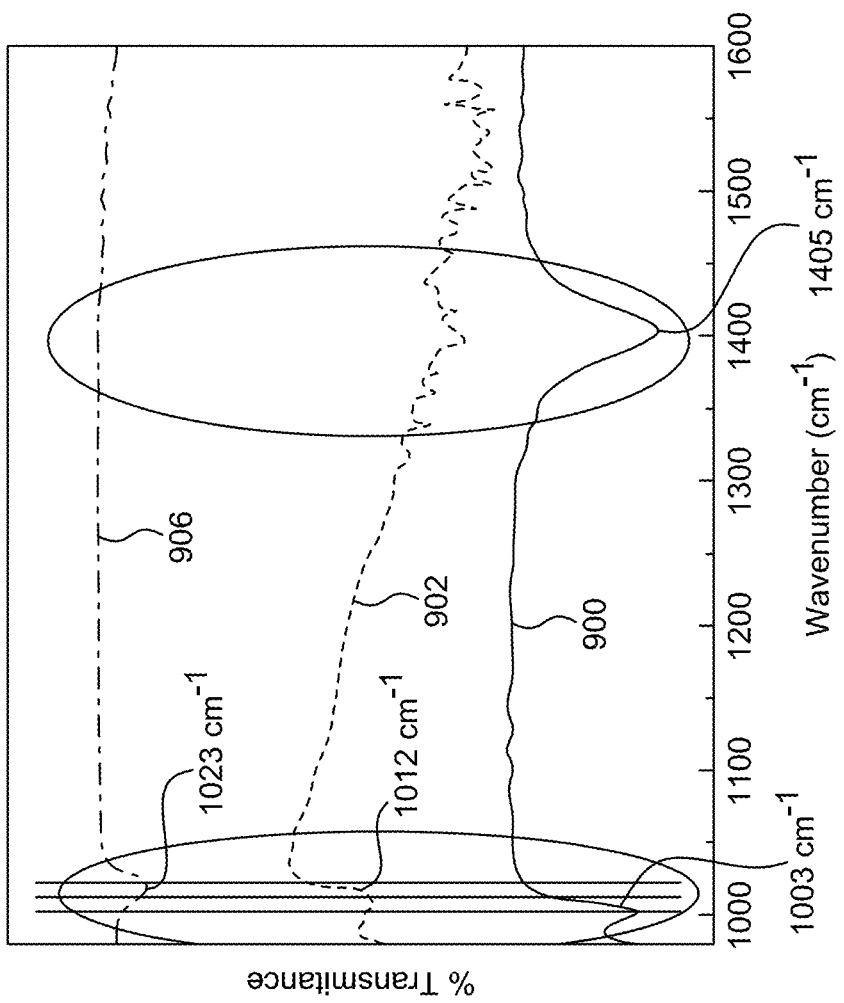
FIG. 9 illustrates a Fourier transform infrared spectroscopy (FT-IR) spectra for ZVO, CVO, and CZVO samples nanostructures, according to certain embodiments.

FT-IR spectra for ZVO (900), CVO (902) and CZVO 1:5 (906) samples were recorded in the range of 625 to 2000 $cm^{-1}$. The region of interest, where most V-O vibrational modes existed, is shown in FIG. 9. The dominant peak at 1003 $cm^{-1}$ corresponds to V=O, and V-O-V joined vibrations. In the case of CV, V=O, and V-O-V joined vibrations observed at a slightly shifted position, i.e., 1012 $cm^{-1}$. The high energy peaks beyond 1350 $cm^{-1}$ bands are indicative of metal vanadates. As in the case of Raman spectroscopy, a similar shift is observed in positions of combined peaks in the FT-IR spectrum of CZVO 1:5 (906), which supports the formation of successful hybrid and heterojunction formation.

XRD Pattern after Photostability Measurements

Figure 10:
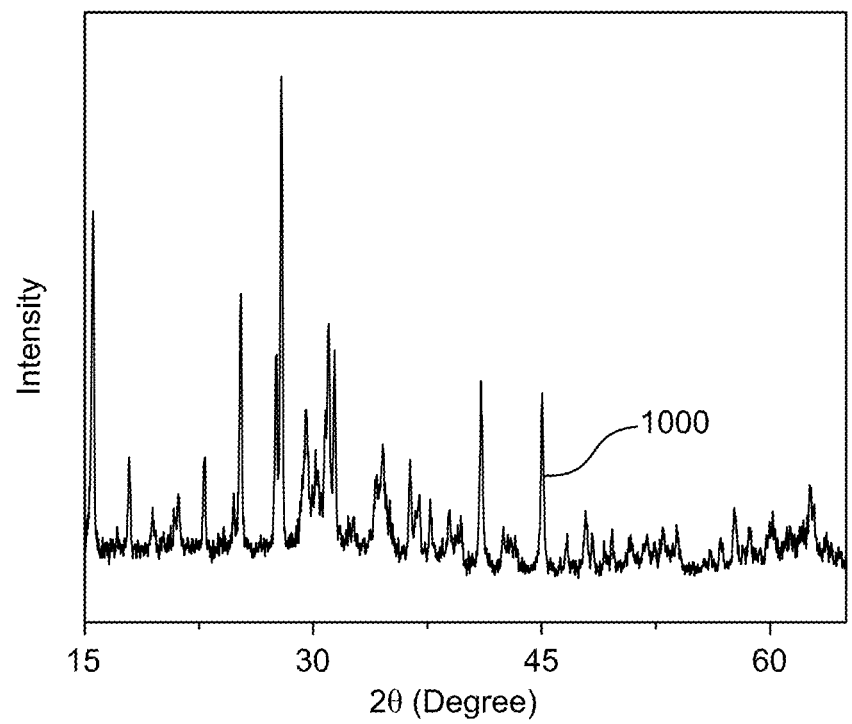
FIG. 10 illustrates XRD pattern of CZVO photoanode after photostability measurement, according to certain embodiments.

As expected, the CZVO 1:5 photoanode lost its mechanical as well as structural stability and the XRD patterns in FIG. 10 is accompanied with some new patterns, which did not appear in the CZVO 1:5 photoanode (1000) sample before photostability analysis. This confirms that the sample is changed due to severe photo-electrochemical reactions at the photoanode interface.

Figure 11:
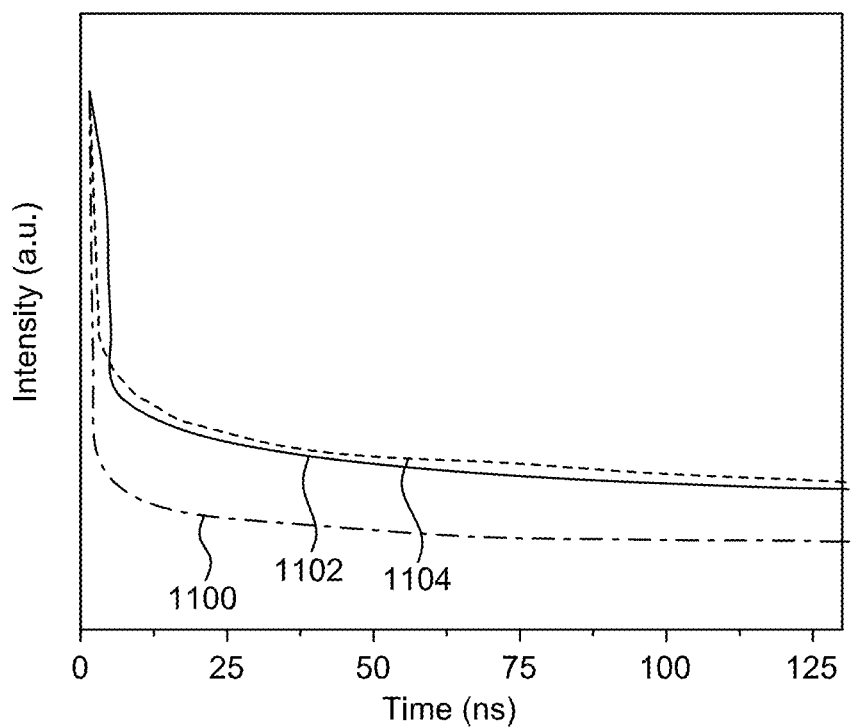
FIG. 11 illustrates time-resolved fluorescence (TRF) spectra for ZVO, CVO, and CZVO samples, according to certain embodiments.

The FLS920 fluorescence spectrophotometer was used to record time-resolved fluorescence (TRF) decay spectra for bare and heterojunction photoanodes. As shown in FIG. 11, the CZVO 1:5 (1100) sample exhibit longest carriers lifetime in comparison with CVO (1104) and ZVO (1102) components. The originated prolonged PL lifetime of CZVO 1:5 (1100) agreed with the photocatalytic and photo-electrochemical performance of these samples. Moreover, as indicated by the UV-visible results the bandgap is lowered in the case of CZVO hybrid. Similar pattern was observed for tricomponent $BiVO_4$—$TiO_2$/rGO hetero-nanocomposites. The prolonged lifetime effectively improves the separation of photo-excitons, and consequently the photostability and other characteristics of the sample.

A method for synthesis of the trimetallic $Cu_2V_2O_7$/$Zn_2V_2O_6$ (CZVO) heterojunction was synthesized and investigated for its photocatalytic and PEC water oxidation performance. XPS results confirm the heterojunction formation between $Cu_2V_2O_7$ (CVO) and $Zn_2V_2O_6$ (ZVO), which is accountable for improved photo-response in the CZVO hybrid. CVO and ZVO with a 1:5 wt. % ratio (CZVO 1:5) demonstrated the highest photodegradation, which is 2.4-folds and 1.9-folds of neat CVO and ZVO, respectively. CZVO 1:5 photoanode generated 1.78 mA $cm^2$ photocurrent density ($I_{ph}$) at 1.23 $V_{RHE}$, almost 3.1 and 1.6 times as high as that of CVO and ZVO photoanodes, respectively. Moreover, the CZVO 1:5 photoanode delivers the highest solar-harvesting performance at 320 nm in terms of the IPCE320 nm, which is 37.93%. Finally, the photostability of CZVO 1:5 was retained for more than 2 h under incident light irradiation with only a 1% efficiency decline. The controlled morphology of CZVO 1:5, firm contact, and uniform distribution of ZVO NPs over CVO nanosheets are attributed to state-of-the-art solar-driven photodegradation and water oxidation heterojunction.

The components of the hybrid photoactive heterojunction, metal vanadates (consisting of binary metal oxides) have been considered for their bifunctional photocatalytic dye decontamination and water-splitting characteristics. Metal vanadates are anticipated for photoinduced applications due to their adequate optoelectrical properties, predominantly n-type nature, and significant photostability. The present disclosure provides the solar-induced bifunctional applications of novel copper vanadate and zinc vanadate (CZVO) heterojunctions having distinct unprecedented morphologies.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A hybrid photoactive heterojunction, comprising:
   copper vanadate, $Cu_2V_2O_7$ (CVO);
   zinc vanadate, $Zn_2V_2O_6$ (ZVO); and
   wherein particles of the ZVO are dispersed in particles of the CVO to form the hybrid photoactive heterojunction,
   wherein the ZVO is in the form of substantially ovoid shaped tablet nanoparticles having an average length of 200-400 nm, an average width of 100-300 nm, and an average thickness of 50-150 nm;
   the CVO is in the form of layered nanosheets having an average thickness of 30-50 nm and an average spacing of 100-300 nm between layers;
   at least a portion of the ZVO nanoparticles penetrate between the layers of the CVO; and
   at least a portion of the ZVO nanoparticles are on top of the layers of the CVO.

2. The hybrid photoactive heterojunction of claim 1, comprising:
   a CVO to ZVO weight ratio of 1-5:1-5, based on the total weight of the CVO and ZVO.

3. The hybrid photoactive heterojunction of claim 1, wherein:
   the CVO and ZVO are at least 95% monoclinic crystal phase.

4. A photoactive film, comprising:
   a hybrid photoactive heterojunction, comprising:
   copper vanadate, $Cu_2V_2O_7$ (CVO);
   zinc vanadate, $Zn_2V_2O_6$ (ZVO); wherein particles of the ZVO are dispersed in particles of the CVO to form the hybrid photoactive heterojunction; and
   a substrate;
   wherein the substrate is at least partially coated with the hybrid photoactive heterojunction.

5. The photoactive film of claim 4, wherein:
   the substrate is selected from a group consisting of fluorinated tin oxide, indium tin oxide, and aluminum doped zinc oxide.

6. The photoactive film of claim 4, having:
   a photo-current density of 1.3-1.9 mA cm$^{-2}$ at 1.1-1.3 $V_{RHE}$; and
   the CVO to ZVO weight ratio of 1:1-5 based on the total weight of the CVO and ZVO.

7. The photoactive film of claim 6, wherein:
   at least 95% of the photo-current density is maintained after up to 2 hours of light exposure.

8. The photoactive film of claim 4, having:
   an incident photon to current conversion efficiency up to 35% at 300-350 nm; and
   the CVO to ZVO weight ratio of 1:1-5 based on the total weight of the CVO and ZVO.

9. The photoactive film of claim 4, having:
   a bandgap of 1.9-2.0.

* * * * *